US012201942B2

(12) United States Patent
Kim et al.

(10) Patent No.: US 12,201,942 B2
(45) Date of Patent: Jan. 21, 2025

(54) BORON-NITRIDE NANOTUBE MEMBRANES

(71) Applicants: THE BOARD TRUSTEES OF THE UNIVERSITY OF ILLINOIS, Urbana, IL (US); RUTGERS, THE STATE UNIVERSITY OF NEW JERSEY, Piscataway, NJ (US)

(72) Inventors: Sangil Kim, Urbana, IL (US); Jerry Shan, Piscataway, NJ (US); Semih Cetindag, Piscataway, NJ (US); Aaditya Pendse, Urbana, IL (US); Robert Praino, Canton, MA (US)

(73) Assignees: The Board of Trustees of the Unviersity of Illinois, Urbana, IL (US); The State University of New Jersey, Piscataway, NJ (US)

( * ) Notice: Subject to any disclaimer, the term of this patent is extended or adjusted under 35 U.S.C. 154(b) by 415 days.

(21) Appl. No.: 16/631,082

(22) PCT Filed: Jul. 13, 2018

(86) PCT No.: PCT/US2018/042157
§ 371 (c)(1),
(2) Date: Jan. 14, 2020

(87) PCT Pub. No.: WO2019/014633
PCT Pub. Date: Jan. 17, 2019

(65) Prior Publication Data
US 2020/0147559 A1 May 14, 2020

Related U.S. Application Data

(60) Provisional application No. 62/532,740, filed on Jul. 14, 2017.

(51) Int. Cl.
B01D 69/02 (2006.01)
B01D 61/00 (2006.01)
(Continued)

(52) U.S. Cl.
CPC .......... B01D 61/002 (2013.01); B01D 63/08 (2013.01); B01D 67/00793 (2022.08);
(Continued)

(58) Field of Classification Search
CPC .............. B01D 69/148; B01D 67/0079; B01D 67/0093; B01D 69/02; B01D 69/06;
(Continued)

(56) References Cited

U.S. PATENT DOCUMENTS 8,940,173 B2   1/2015   Bakajin et al.
9,216,391 B2  12/2015   Revanur et al.
(Continued)

FOREIGN PATENT DOCUMENTS

CN   104084061 A   10/2014
CN   103962015 B    8/2016
(Continued)

OTHER PUBLICATIONS

Sakhavand et al. (3D Porous Boron Nitride Nanostructures, J. Phys. Chem. C, 2014, 118, pp. 22730-38)) (Year: 2014).*
(Continued)

Primary Examiner — Hayden Brewster
(74) Attorney, Agent, or Firm — McDonnell Boehnen Hulbert & Berghoff LLP

(57) ABSTRACT

Disclosed herein are boron-nitride nanoparticle membranes and methods of manufacturing boron-nitride nanoparticle membranes. In an embodiment, a boron-nitride nanoparticle membrane includes a matrix and a plurality of one-dimensional boron-nitride nanoparticles disposed within the matrix, where he plurality of boron-nitride nanoparticles are configured for selective molecular transport through each of the plurality of one-dimensional boron-nitride nanoparticles.

14 Claims, 23 Drawing Sheets

(51) Int. Cl.
*B01D 63/08* (2006.01)
*B01D 67/00* (2006.01)
*B01D 69/06* (2006.01)
*B01D 69/14* (2006.01)
*B01D 71/02* (2006.01)
*B01D 71/54* (2006.01)
*F03G 7/00* (2006.01)

(52) U.S. Cl.
CPC ......... *B01D 67/0093* (2013.01); *B01D 69/02* (2013.01); *B01D 69/06* (2013.01); *B01D 69/1411* (2022.08); *B01D 69/148* (2013.01); *B01D 71/0213* (2022.08); *B01D 71/54* (2013.01); *F03G 7/005* (2013.01); *B01D 2323/21* (2013.01); *B01D 2323/345* (2013.01); *B01D 2323/35* (2013.01); *B01D 2325/0283* (2022.08)

(58) Field of Classification Search
CPC .... B01D 71/02; B01D 71/54; B01D 2323/21; B01D 2323/345; B01D 2323/35; B01D 2325/02; B01D 2323/30; B01D 2323/34; B01D 2325/14; B01D 67/0006; B01D 67/009; B01D 69/105; B01D 69/141; B01D 63/08; B01D 61/002; F03G 7/005
USPC ..................................................... 210/500.21
See application file for complete search history.

(56) References Cited

U.S. PATENT DOCUMENTS

| | | | |
|---|---|---|---|
| 2003/0155692 A1* | 8/2003 | Luzzi | B82Y 15/00 |
| | | | 264/346 |
| 2010/0025330 A1* | 2/2010 | Ratto | B01D 69/141 |
| | | | 427/244 |
| 2010/0069606 A1* | 3/2010 | Bangera | A61K 38/1732 |
| | | | 977/734 |
| 2014/0302579 A1* | 10/2014 | Boulanger | B08B 17/02 |
| | | | 428/221 |

FOREIGN PATENT DOCUMENTS

CN 105879701 A 8/2016
KR 20160017468 A 2/2016

OTHER PUBLICATIONS

Weber et al., "Boron Nitride Nanoporous Membranes with High Surface Charge by Atomic Layer Deposition," ACS Applied Materials & Interfaces 9(19):16669-78 (May 17, 2017).

Li et al., "Free-standing membranes made of activated boron nitride for efficient water cleaning," RSC Advances 5 (88):71537-43 (Aug. 18, 2015).

Arenal et al., "Boron-nitride and boron-carbonitride nanotubes: synthesis, characterization and theory," Advances in Physics 59(2):101-79 (Feb. 15, 2010).

* cited by examiner

210

BORON-NITRIDE NANOTUBE MEMBRANES

CROSS-REFERENCE TO RELATED APPLICATIONS

This application is a U.S. National Phase Application Under 35 U.S.C. § 371 of International Application No. PCT/US2018/042157, filed Jul. 13, 2018, which claims priority to U.S. Provisional Patent Application No. 62/532,740, filed Jul. 14, 2017, the contents of these applications being incorporated entirely herein by reference.

STATEMENT REGARDING FEDERALLY SPONSORED RESEARCH OR DEVELOPMENT

This invention was made with government support under award/project number 1762913, awarded by the National Science Foundation. The government has certain rights in the invention.

FIELD

This disclosure relates to one-dimensional (1D) boron-nitride nanoparticle (BNNP) membranes and fabrication methods of the 1D boron-nitride nanoparticle membranes. Additionally, this disclosure relates to systems and methods for using boron-nitride nanoparticle membranes in various applications, such as desalination, ionic separation, and energy harvesting.

BACKGROUND

Controlled molecule transport in nanopores is at the heart of many chemical, biological, pharmaceutical, and petrochemical processes. To be effective, a molecular-filtration membrane should be highly permeable and selective. In both of these respects, nanotube-based membranes, characterized as having straight pore channels and uniform pore sizes with well-defined one-dimensional nanostructures, have inherent advantages over conventional membranes consisting of a random network of different-sized pores. However, in practice, many nanotube-based membranes have drawbacks that prevent the membranes from being used widely especially in desalination and nanofiltration, energy conversions, energy storages, and many others in which require selective ion transports. One common drawback of one-dimensional nanostructured membranes is a lack of efficient manufacturing methods to fabricate the nanostructured composite membranes comprising of charged one-dimensional nanopores.

SUMMARY

In an aspect, a membrane is disclosed. The membrane includes a matrix, and a plurality of one-dimensional boron-nitride nanoparticles disposed within the matrix, where the plurality of boron-nitride nanoparticles are configured for selective molecular transport through each of the plurality of one-dimensional boron-nitride nanoparticles.

In another aspect, the one-dimensional boron-nitride nanoparticles of the membrane include at least one of boron-nitride nanotubes and one-dimensional boron-nitride coated nanopores.

In another aspect, the matrix is at least one of polymeric matrix and an inorganic matrix.

In another aspect, the plurality of one-dimensional boron-nitride nanoparticles are vertically aligned with respect to a linear extent of the membrane.

In another aspect, each of the plurality of one-dimensional boron-nitride nanoparticles has a surface charge that selectively repels at least one predetermined type of molecule, thereby enabling charged-species-selective transport through each of the plurality of boron-nitride nanoparticles.

In another aspect, each of the plurality of boron-nitride nanoparticles has a surface charge density of at least 0.01 $C/m^2$.

In another aspect, the plurality of one-dimensional boron-nitride nanoparticles in the membrane have a density of at least $10^8$ nanoparticles/$cm^2$.

In another aspect, the plurality of one-dimensional boron-nitride nanoparticles are randomly arranged within the matrix.

In another aspect, the plurality of one-dimensional boron-nitride nanoparticles are uniformly dispersed in the matrix.

In another aspect, each of the plurality of one-dimensional boron-nitride nanoparticles extends along a length of the membrane from a first end to a second end of the membrane.

In another aspect, the plurality of one-dimensional boron-nitride nanoparticles are arranged in one or more rows in the matrix.

In another aspect, the membrane further comprises a membrane support that (i) induces alignment of the plurality of one-dimensional boron-nitride nanoparticles, and (ii) supports the matrix In another aspect, the membrane support is a nanoporous membrane.

In another aspect, the membrane support is a macroporous membrane.

In another aspect, the membrane support is a microporous membrane.

In another aspect, the plurality of one-dimensional boron-nitride nanoparticles have a variable density across the membrane In another aspect, a material of the matrix is selectively permeable.

In another aspect, the matrix comprises functional groups configured to increase a selectivity of the membrane.

In another aspect, the matrix material has negligible molecular transport or is a rigid material.

In another aspect, one or more of the plurality of one-dimensional boron-nitride nanoparticles have a respective length shorter than a dimension of the membrane.

In another aspect, the plurality of one-dimensional boron-nitride nanoparticles have diameters from about 0.5 nanometers to about 100 nanometers.

In another aspect, the plurality of one-dimensional boron-nitride nanoparticles are grown on a substrate using chemical vapor deposition (CVD) or atomic layer deposition (ALD).

In another aspect, the substrate is a silicon, quartz, or oxide substrate.

In another aspect, the plurality of one-dimensional boron-nitride nanoparticles are synthesized using at least one of arc jet plasmas, mechanical ball milling, laser-ablation pyrolysis.

In another aspect, the plurality of one-dimensional boron-nitride nanoparticles comprise a thin hexagonal boron nitride layer deposited within pores of a nanoporous substrate.

In another aspect, the nanoporous substrate is an alumina oxide, silicon dioxide, zirconia oxide, or members of a metal oxide substrate.

In another aspect, the membrane is configured for use in a desalination, nanofiltration, and water purification applications.

In another aspect, the membrane is configured for use in osmotic power harvesting.

In another aspect, the membrane is configured for ion, dye, and charged-molecule separation.

In another aspect, an energy harvesting device is disclosed. The energy harvesting device includes a one-dimensional boron-nitride nanoparticle membrane. The membrane includes a polymeric or an inorganic matrix, and a plurality of boron-nitride nanoparticles disposed within the matrix, where the plurality of one-dimensional boron-nitride nanoparticles are configured for energy generation by osmotic transport of ions through the plurality of one-dimensional boron-nitride nanoparticles. The energy harvesting device also includes a first solution and a second solution separated by the one-dimensional boron-nitride nanoparticle membrane, where the first solution has a first ion concentration and the second solution has a second ion concentration.

In another aspect, a method of fabricating a membrane is disclosed. The method includes dispersing a plurality of one-dimensional boron-nitride nanoparticles in a liquid pre-polymer, wherein the liquid pre-polymer is placed between two conductive electrodes. The method also includes applying an electric field between the two conductive electrodes, and curing a surface layer of the liquid pre-polymer. Further, the method includes uncapping the plurality of boron-nitride nanoparticles to enable molecular transport through the plurality one-dimensional boron-nitride nanoparticles.

In another aspect, the liquid pre-polymer is an oligomer.

In another aspect, the oligomer is aromatic urethane acrylate.

In another aspect, the liquid pre-polymer is cured using UV light from a UV light source, wherein the surface layer of the liquid pre-polymer is cured to a membrane curing depth determined based on at least one of an angle, an intensity, a duration, a wavelength of the UV light, and a concentration and absorption coefficient of the pre-polymer or photo-initiator.

In another aspect, uncapping the plurality of one-dimensional boron-nitride nanoparticles involves etching the membrane and the plurality of one-dimensional boron-nitride nanoparticles.

In another aspect, a thickness of the cured surface layer is nearly a length of the plurality of one-dimensional boron-nitride nanoparticles.

In another aspect, the plurality one-dimensional boron-nitride nanoparticles in a liquid pre-polymer is dispersed using at least one of shear mixing and ultrasonication.

In another aspect, the electric field is generated by applying an AC voltage to the two conductive electrodes, and the method further includes electrophoretically driving the plurality of one-dimensional boron-nitride nanoparticles toward one electrode by applying a DC voltage to the one electrode.

In another aspect, a membrane is formed by the method described above.

In another aspect, a method of fabricating a membrane is disclosed. The method includes growing a plurality of one-dimensional boron-nitride nanotubes on a substrate, where the plurality of one-dimensional boron-nitride nanoparticles extend from a first end of the membrane to a second end of the membrane. The method also includes infiltrating gaps between the plurality of one-dimensional boron-nitride nanoparticles on the substrate with one or more matrix materials. Further, the method includes etching the plurality of one-dimensional boron-nitride nanoparticles on the first end and the second end of the membrane in order to open the plurality of boron-nitride nanotubes for selective molecular transport through the boron-nitride nanotubes.

In another aspect, a membrane is formed by the method described above.

In another aspect, a method of fabricating a membrane is disclosed. The method involves dispersing a plurality of one-dimensional boron-nitride nanoparticles in a liquid pre-polymer. The method also involves filtering the liquid pre-polymer through a porous membrane support, where the porous membrane support induces an alignment of the plurality of one-dimensional boron-nitride nanoparticles in a direction orthogonal to a top surface of the membrane support. Further, the method involves fixing the plurality of boron-nitride nanoparticles in a polymer matrix formed by an in-situ polymerization process of the liquid pre-polymer.

In another aspect, a membrane is formed by the method described above.

In another aspect, a method is disclosed. The method involves determining a desired density of one-dimensional boron-nitride nanoparticles in a boron-nitride nanoparticle membrane. The method also involves fabricating the boron-nitride nanoparticle membrane with the desired density of one-dimensional boron-nitride nanoparticles, wherein one-dimensional boron-nitride nanoparticles membrane comprises a plurality of one-dimensional boron-nitride nanoparticles dispersed within a polymeric matrix, and wherein the plurality of one-dimensional boron-nitride nanoparticles are configured for selective molecular transport through each of the plurality of one-dimensional boron-nitride nanoparticles.

In another aspect, a method of fabricating a one-dimensional boron-nitride nanoparticles membrane is disclosed. The method involves determining an amount of one-dimensional boron-nitride nanoparticles to disperse in a liquid pre-polymer based on a desired density of one-dimensional boron-nitride nanoparticles in the membrane. The method also involves dispersing the amount of one-dimensional boron-nitride nanoparticles in the liquid pre-polymer, where the liquid pre-polymer is placed between two conductive electrodes. Further, the method involves applying an electric field between the two conductive electrodes, and curing a surface layer of the liquid pre-polymer. Yet further, the method involves uncapping the plurality of one-dimensional boron-nitride nanoparticles to enable molecular transport through the plurality boron-nitride nanoparticles.

In another aspect, the desired density of one-dimensional boron-nitride nanoparticles is determined based on a desired use of the one-dimensional boron-nitride nanoparticles membrane.

In another aspect, at least one end of at least one of the one-dimensional boron-nitride nanoparticles is functionalized with members of an acidic group, basic group, or a permanent charged group.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
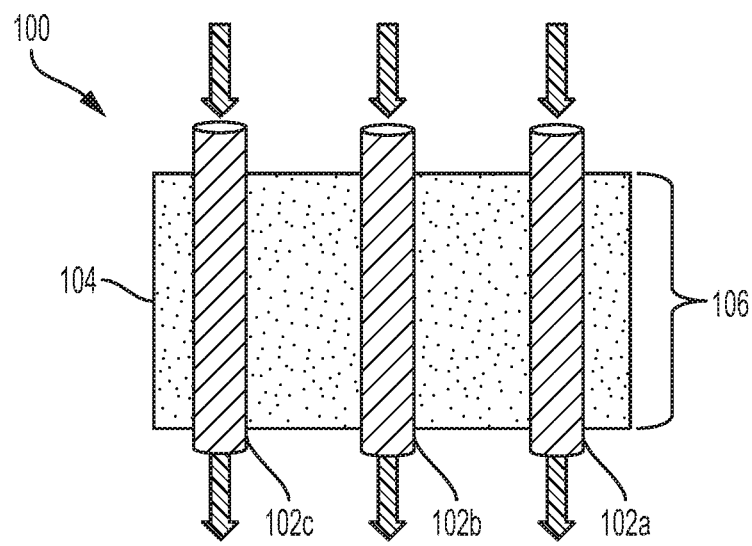
FIGS. 1a and 1b each illustrate an aligned boron-nitride nanoparticle membrane, according to example embodiments.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments can include more or less of each element shown in a given Figure. Further, some of the illustrated elements can be combined or omitted. Yet further, an example embodiment can include elements that are not illustrated in the Figures.

I. Overview

Disclosed herein are boron-nitride nanoparticle membranes that can be used in a variety of applications and that do not suffer from many of the drawbacks from which other nanotube-based membranes suffer. The boron-nitride nanoparticle membranes include at least one of boron-nitride nanotubes and boron-nitride coated nanopores (e.g., one-dimensional nanopores). Both the boron-nitride nanotubes and boron-nitride coated nanopores can transport or carry molecules, ions, etc.

Notably, boron-nitride nanoparticle membranes can be used in many applications because boron-nitride nanoparticles have high surface charge density values. As a result of the high surface charge density values of boron-nitride nanoparticles, a boron-nitride nanoparticle membrane can have a high selectivity and a high permeability. For example, the boron-nitride nanoparticle membrane may be selective to a predetermined type of molecule or ion (e.g., negatively charged ion). As a result of being highly selective and permeable, the membranes can be configured for rapid transport of certain molecules through the membrane. For example, the boron-nitride nanoparticle membranes may be 10%-100% selective. Further, the membranes can be configured to prevent other molecules from being transported or to slow down the transport of other molecules through the membrane. Further, boron-nitride nanoparticle membranes can have a high chemical and mechanical stability.

Also disclosed herein are methods of manufacturing boron-nitride nanoparticle membranes. Specifically, boron-nitride nanoparticle membranes can be categorized based on an alignment of the boron-nitride nanoparticles in the membranes into two categories: vertically aligned boron-nitride nanoparticle membranes and randomly oriented boron-nitride nanoparticle membranes. Disclosed herein are methods and systems for fabricating both vertically aligned boron-nitride nanoparticle membranes and randomly oriented boron-nitride nanoparticle membranes. Generally, vertically aligned boron-nitride nanoparticles membranes may result in a higher selectivity and permeability, but randomly oriented boron-nitride nanoparticle membranes may be fabricated more efficiently.

In particular, disclosed herein are solution-based methods for manufacturing nanoparticle membranes. Solution-based manufacturing methods have several advantages. First, solution-based methods have the advantage of being compatible with roll-to-roll (R2R) manufacturing methods. Therefore, solution-based methods can be used to scalably and efficiently manufacture large-area membranes. Second, solution-based methods are also flexible in the source and types of nanoparticles used for membrane fabrication. Bulk nanoparticles of any type can be grown by any process and be efficiently self-assembled from solution into a membrane. Third, because solution-based approaches are performed at room temperature, such approaches offer easier integration onto different substrates and membrane-backing materials.

Also disclosed herein are applications in which boron-nitride nanoparticle membranes can be used. For example, the boron-nitride nanoparticle membranes can be used for efficient harvesting of osmotic power in any system where there is an osmotic gradient. Other example uses include, but are not limited to, hemodialysis, ionic separation, petrochemical separations, water filtration, and water desalination.

II. Example Boron-Nitride Nanotube Membranes a. Aligned Boron-Nitride Nanotube Membranes FIG. 1a illustrates a boron-nitride nanoparticle membrane 100, according to an example embodiment. As shown in FIG. 1a, the boron-nitride nanoparticle membrane 100 can include boron-nitride nanotubes 102a,b,c dispersed in a matrix 104. The boron-nitride nanotubes 102a,b,c may have diameters from about 0.5 nanometers to about 100 nanometers, among other examples. Further, boron-nitride nanotubes 102a,b,c may be single-walled or multi-walled nanotubes. The matrix 104 may be a material configured to support the boron-nitride nanoparticles in the boron-nitride nanoparticle membrane 100.

In an example, the matrix may be a polymeric matrix (e.g., an organic polymeric matrix). Polymeric matrices include, but are not limited to, polyimide, polysulfone, a cellulose acetate, a polycarbonate, a polymethacrylatepolystyrene, polymethyl methacrylate, polyvinyl alcohol, polylactidepolycaprolactone copolymers, and Nafion (a sulfonated tetrafluoroethylene based fluoropolymer-copolymer that is conductive to cations and permeable to water). The polymeric matrix 104 can support the boron-nitride nanotubes 102a,b,c. In another example, the matrix may be an inorganic matrix. Inorganic matrices include, but are not limited to, ceramic, oxides, and silicon nitride.

The boron-nitride nanotubes 102a,b,c can each have an inner hollow diameter through which molecules can travel from one end of the nanotube to the other end. Accordingly, the boron-nitride nanotubes 102a,b,c can form transport paths, or portions thereof, through the membrane 100. Because the boron-nitride nanotubes 102a,b,c have a high surface charge, the transport paths can be selective transport paths. Accordingly, a nanotube can selectively allow molecules to flow through the transport path formed by the nanotube. For instance, because the boron-nitride nanotubes 102a,b,c can have a negative surface charge, positively charged ions can be transported through the nanotubes 102a,b,c while negatively charged ions can be prevented from traveling through the nanotubes 102a,b,c.

In an embodiment, the boron-nitride nanotubes 102a,b,c can be aligned in the membrane 100 in a particular direction. For instance, as shown in FIG. 1a, the boron-nitride nanotubes 102a,b,c can be vertically aligned with respect to a thickness 106 of the membrane. Such nanotubes can be referred to as vertically aligned boron-nitride nanotubes (VA-BNNTs), and the membrane can be referred to as a vertically aligned boron-nitride nanoparticle membrane.

In an implementation, a length of each of the nanotubes 102a,b,c can extend from a first end of the membrane 100 to a second end of the membrane. For example, as illustrated in FIG. 1a, the nanotubes 102a,b,c can extend along a thickness 106 of the membrane 100 from a top surface to a bottom surface of the membrane. In such an example, the transport paths formed by the nanotubes 102a,b,c can extend continuously through the membrane 100, thereby providing continuous selective pathway for molecular transport across the entire membrane thickness. Accordingly, as indicated by the arrows in FIG. 1a, a molecule can enter from one end of the boron-nitride nanotubes 102a,b,c and can be transported to other side of the membrane 100.

In some examples, the matrix 104 can be permeable (e.g., to water or other species). A molecule can travel through the matrix 104 using a classic diffusion or a solution-diffusion transport mechanism. A permeable matrix 104 can provide additional transport paths for molecular transport through the membrane 100. Selecting a permeable matrix can increase an overall selectivity of the membrane 100. Furthermore, the selectivity of the permeable matrix itself can also be increased, perhaps by functionalizing the matrix. In other examples, a material of the matrix can be impermeable. Impermeable materials have negligible molecular transport (e.g., 1-10% permeable, among other examples) or can be a rigid material (e.g., polyimide, polydimethylsiloxane, ceramic, silicon nitride). As a result, when the matrix is impermeable, the transport paths for molecular transport can be solely through the boron-nitride nanotubes 102a,b,c.

Figure 1B:
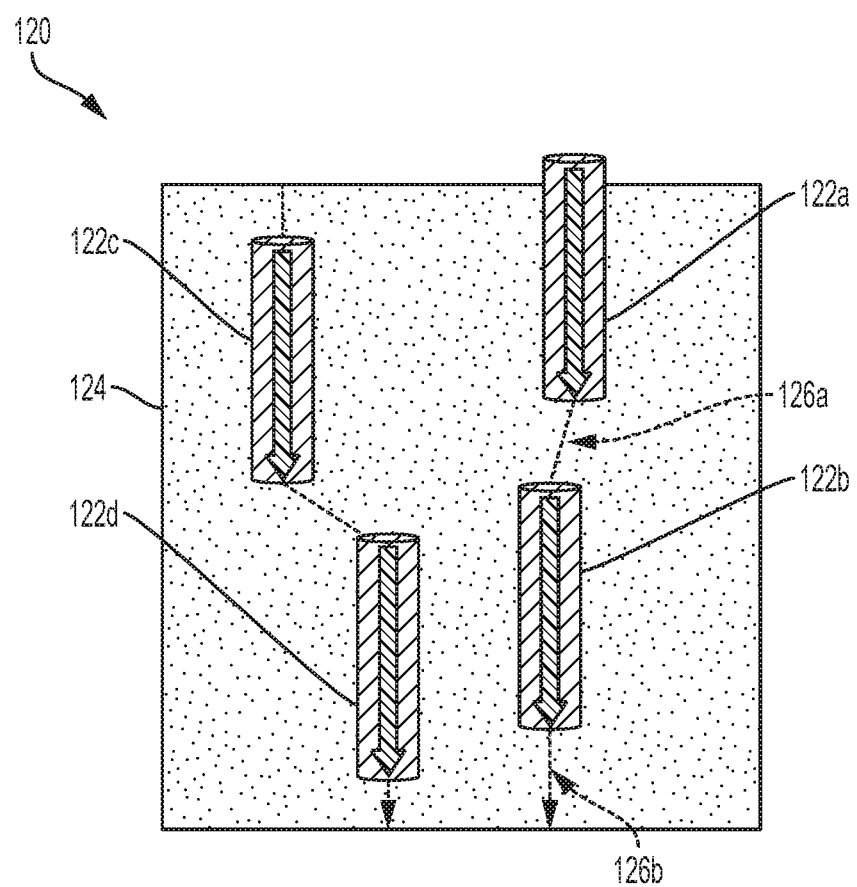

FIG. 1b illustrates another example of a boron-nitride nanoparticle membrane 120, according to an example embodiment. The membrane 120 can also include boron-nitride nanotubes 122a-d dispersed in a matrix 124 (e.g., polymeric matrix or inorganic matrix). As shown in FIG. 1b, unlike the boron-nitride nanotubes 102a-c of FIG. 1a, the boron-nitride nanotubes 122a-d do not necessarily span the entire thickness of the membrane 120. However, like the boron-nitride nanotubes 102a-c, the boron-nitride nanotubes 122a-d can be vertically aligned.

Vertical alignment of the boron-nitride nanotubes can allow for the matrix 124 to be permeable such that the transport paths for molecular transport can include both the boron-nitride nanotubes 122a-d and the matrix 124. For example, a transport path through the membrane 120 can include the boron nitride nanotubes 122a and 122b and portions of the matrix 126a,b. Accordingly, a molecule that enters the boron nitride nanotube 122a can flow through the nanotube to the portion 126a of the matrix. From there, the molecule can flow through the boron-nitride nanotube 122b to the portion 126b of the matrix, where it can exit the membrane 120.

A boron-nitride nanoparticle membrane of each of these embodiments can have a specified density of boron-nitride nanotubes. For example, a membrane can have boron-nitride pore density of approximately $10$-$10^{10}$ nanotubes/cm$^2$. In some examples, certain applications can require membranes of a particular boron-nitride nanotube density in order to operate properly. For example, in some electrokinetic energy conversion applications (e.g., reverse electrodialysis), a particular boron-nitride pore density can be required to generate a desired osmotic current. Additionally, a membrane can have a variable pore density across the membrane.

Figure 2A:
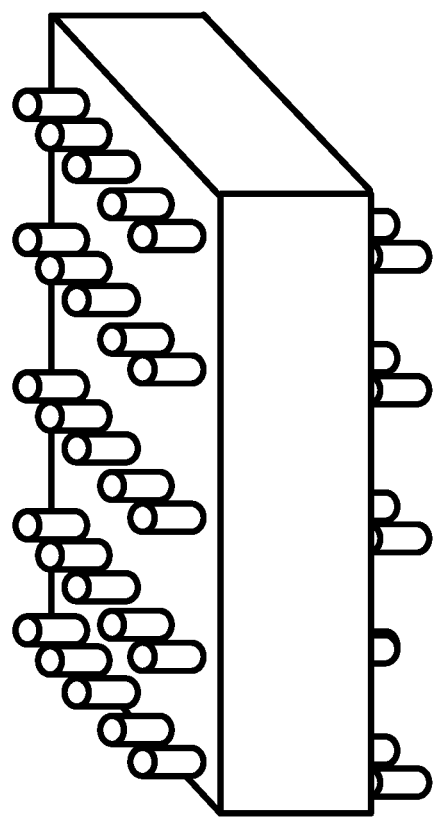
FIGS. 2a, 2b, and 2c illustrate boron-nitride nanoparticle membranes with varying boron-nitride nanotube densities, according to example embodiments.
Figure 2B:
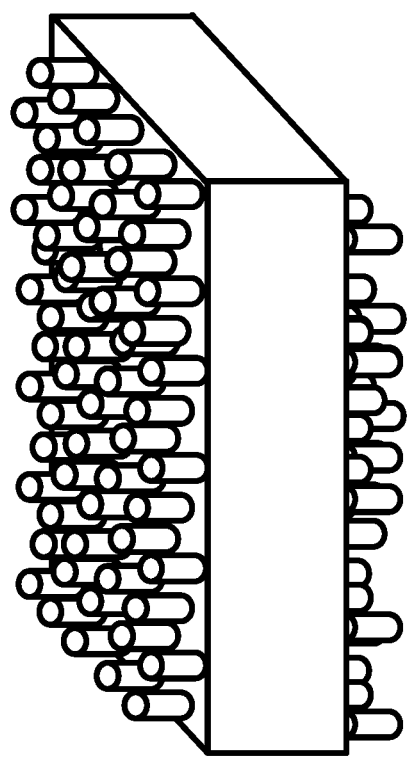
Figure 2C:
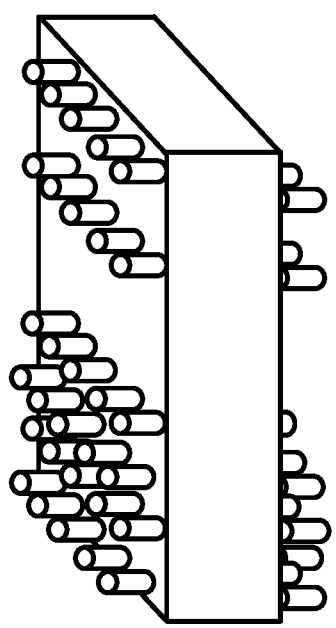

FIGS. 2a, 2b, 2c illustrate example membranes with different pore densities across the membranes, according to an example embodiment. In an example, as shown in FIG. 2a, a boron-nitride nanoparticle membrane 200 can have a uniform density of pores across the membrane. In another example, as shown in FIG. 2b, a membrane 210 can have a higher density of pores than the membrane 200. In yet another example, as shown in FIG. 2c, a membrane 220 can have a variable density of pores across the membrane. For instance, the pores in a first area of the membrane can have a first density, and the nanotubes in a second area of the membrane can have a second density.

b. Randomly Oriented Boron-Nitride Nanotube Membranes

Figure 3:
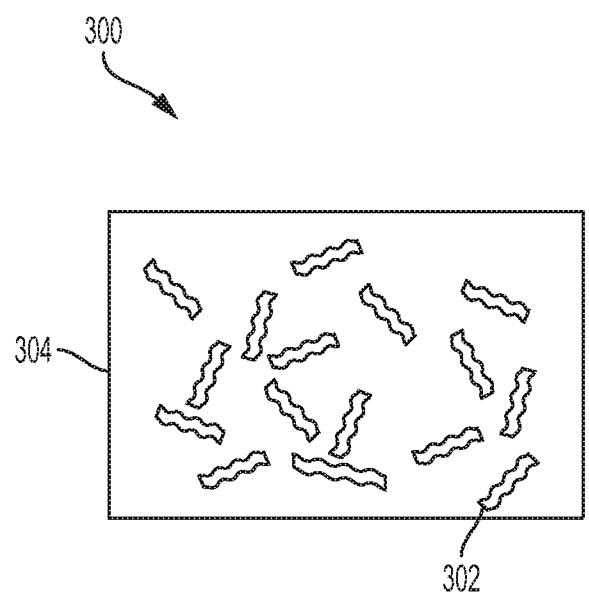
FIG. 3 illustrates a randomly oriented boron-nitride nanoparticle membrane, according to an example embodiment.

FIG. 3 illustrates a boron-nitride nanoparticle membrane 300, according to an example embodiment. In this embodiment, unlike the boron-nitride nanotubes in FIGS. 1a,b, the boron-nitride nanoparticles (e.g., boron-nitride nanotube 302) can be randomly oriented in a polymeric matrix 304. Furthermore, the boron-nitride nanotubes can have different dimensions. For example, a boron-nitride nanotube can span an entire thickness of the membrane 300 while another boron-nitride nanotube can be shorter than the thickness of the membrane 300.

A matrix 304 can be permeable to provide hybrid transport paths from one side of the membrane 300 to another side of the membrane. The hybrid transport paths for molecular transport can include both the boron-nitride nanotubes and the matrix 304. As explained above, a molecule can travel through the matrix 304 using a classic diffusion or solution-diffusion transport mechanism.

Within examples, the boron-nitride nanoparticle membrane 300 can provide a mixed pathway for molecular transport from one side of the membrane to another side. In particular, portions of a transport path for a molecule can be through the matrix 304 while other portions of the transport path can be through the boron-nitride nanoparticle. As explained above, having hybrid transport paths through the matrix 304 and the boron-nitride nanoparticle can increase a selectivity and/or a transport rate of the boron-nitride nanoparticle membrane 300.

III. Example Methods of Fabricating Boron-Nitride Nanoparticle Membranes

Disclosed herein are systems and methods for fabricating boron-nitride nanoparticle membranes. In particular, disclosed herein are systems and methods for fabricating aligned boron-nitride nanoparticle membranes, and systems and methods for fabricating randomly oriented boron-nitride nanoparticle membrane.

a. Aligned Boron-Nitride Nanotube Membranes

Figure 4:
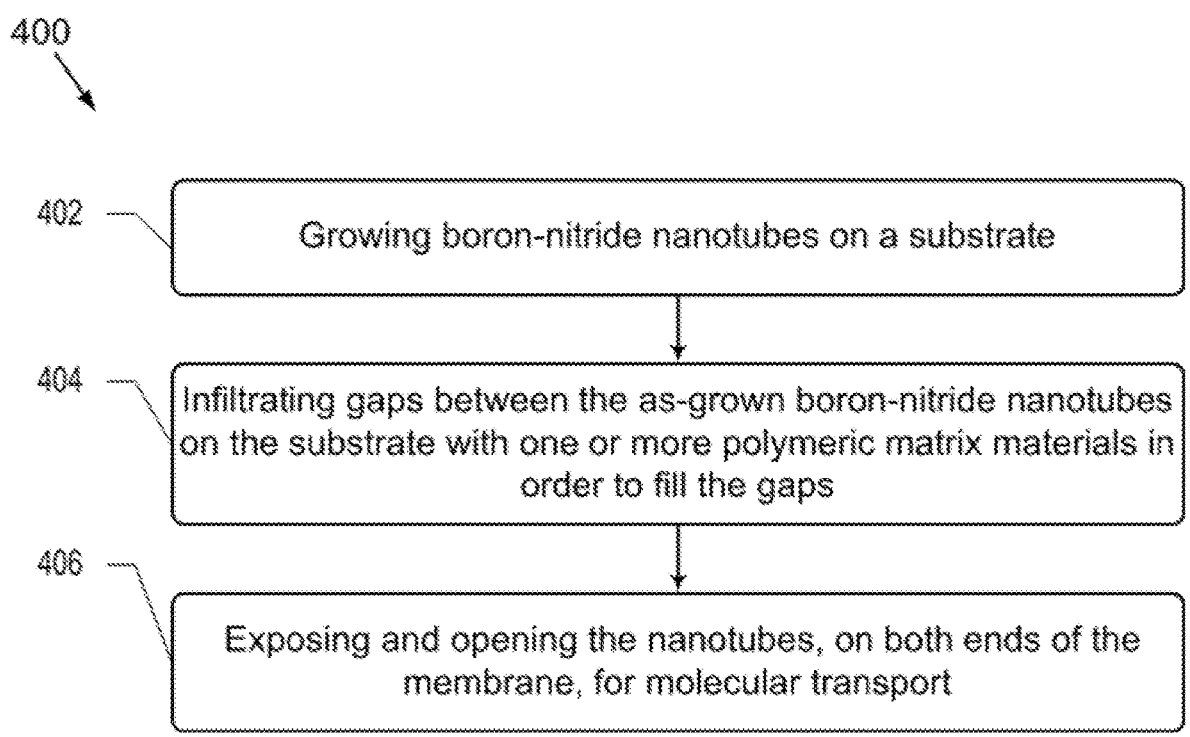
FIG. 4 illustrates a simplified block diagram of a method of manufacturing an aligned boron-nitride nanoparticle membrane, according to an example embodiment.

FIG. 4 illustrates a method 400, according to an example embodiment. It will be understood that the method 400 can include fewer or more steps or blocks than those expressly disclosed herein. Furthermore, respective steps or blocks of method 400 can be performed in any order and each step or block can be performed one or more times.

Block 402 includes growing boron-nitride nanotubes on a substrate (e.g., a silicon, quartz, or oxide substrate). For instance, the boron-nitride nanotubes can be grown on the substrate using chemical vapor deposition (CVD). Growing the nanotubes allows for control of the characteristics of the nanotubes, such as alignment, density, and diameter. For example, the as-grown nanotubes can be vertically aligned. Additionally, the as-grown nanotubes can have specified diameter and/or density, where the specified diameter and density can depend on the application in which the membrane can be used. Other methods of synthesizing the boron-nitride nanotubes can include arc-jet plasmas, mechanical ball milling, and laser-ablation pyrolysis, among others.

Block 404 includes infiltrating gaps between the as-grown boron-nitride nanotubes on the substrate with one or more matrix materials in order to fill the gaps, thereby forming the boron-nitride nanoparticle membrane. The matrix material can include polymeric filler materials such polystyrene and polyimide, among other examples. Additionally and/or alternatively, the matrix material can include inorganic matrix materials such as silicon nitride.

Block 406 includes exposing and opening the nanotubes, on both ends of the membrane, for molecular transport. Within examples, exposing and opening the nanotubes can be achieved by etching the membrane and the nanotubes. For instance, the nanotubes can be opened by an oxidation process that uses an oxygen plasma. Doing so opens entrances in the nanotubes for molecular transport (e.g., transport of solvent, solute, or gas molecules). Other types of etching processes, such as dry etching (e.g., plasma etching, chemical removal, physical removal) and wet etching, are contemplated and possible.

Figure 5:
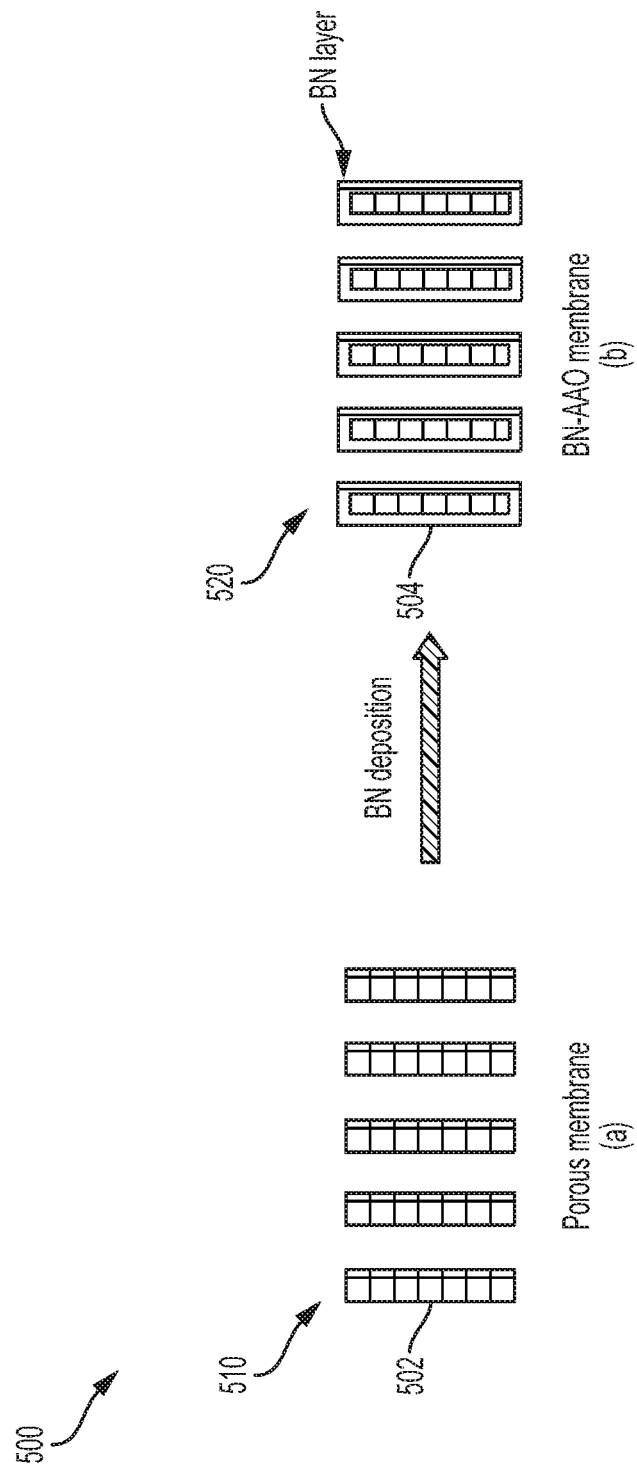
FIG. 5 illustrates a method of manufacturing an aligned boron-nitride nanoporous membrane by depositing a boron-nitride layer on a porous membrane, according to an example embodiment.

FIGS. 5a, 5b illustrate various blocks of a method of manufacture 500, according to one or more example embodiments. FIGS. 5a, 5b can serve as example illustrations for at least some of the blocks or steps described in relation to method 600 as illustrated and described in relation to FIG. 6. Additionally, the blocks of FIGS. 5a, 5b can be carried out so as to provide boron-nitride nanoparticle membranes 100, 120, 200, 210, and/or 220, as illustrated and described in reference to FIGS. 1a-1b and FIGS. 2a-2c.

FIG. 5a illustrates a block 510 of a method of manufacture, according to an example embodiment. Block 510 includes preparing a porous substrate 502 for deposition of a hexagonal boron nitride (h-BN) layer. The porous substrate can be a nanoporous substrate, a microporous substrate, or a macroporous substrate. For instance, the porous can be a nanoporous inorganic substrate (e.g., an anodized alumina oxide substrate). Other example substrates include silicon dioxide, zirconia oxide, or members of a metal oxide.

In an implementation, the boron-nitride layer can be deposited using a low-pressure CVD (LPCVD) system. The LPCVD system can include a split tube furnace with a fused quartz tube. The LPCVD system can also include a separate heated chamber that can be employed for an h-BN precursor (e.g., solid ammonia-borane ($NH_3$—$BH_3$) complex).

Block 520 includes depositing an h-BN layer 504 on the porous substrate 502. When using the LPCVD system, the porous substrate 502 can be placed in a center of the quartz tube's heating zone and heated to a high temperature (e.g., 1000° C.), in some embodiments in an $H_2$ atmosphere to restrict further oxidation. After the tube-heating zone reaches the desired temperature, the h-BN precursor (e.g., ammonia-borane) can be heated in the separate heating chamber to a desired temperature. The resulting mixture (e.g., $H_2$ gas, monomeric amino borane ($BH_2NH_2$), and borazine (($HBNH)_3$) can be then transported to the chamber containing the substrate using $H_2$ as a carrier gas. A pressure of 5-10 Torr can be maintained inside the quartz tube and the reaction time can be approximately 60 minutes followed by rapid cooling (approximately 100° C./min).

Figure 6:
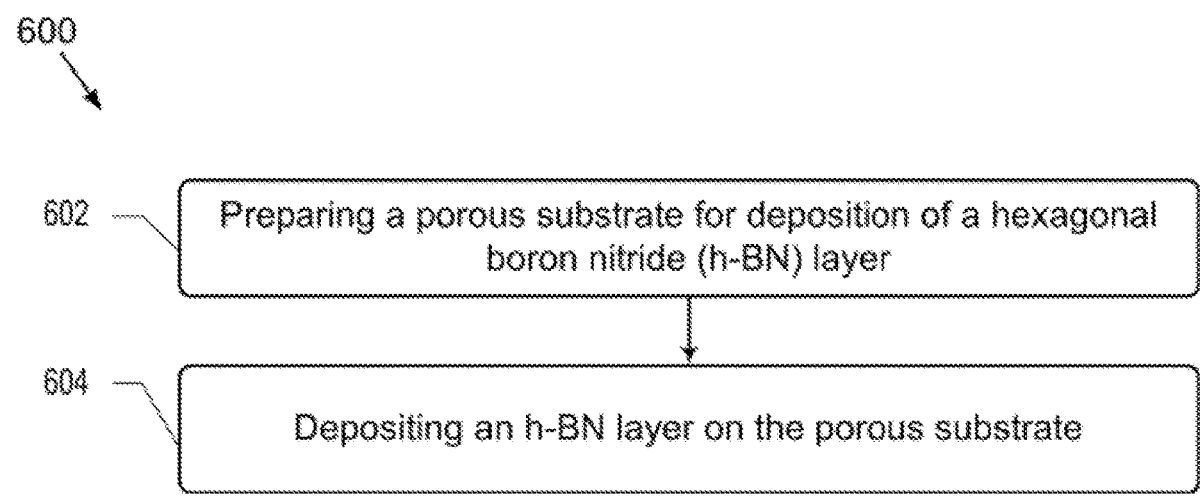
FIG. 6 illustrates a simplified block diagram of method of manufacturing an aligned boron-nitride nanoporous membrane, according to an example embodiment.

FIG. 6 illustrates a method 600, according to an example embodiment. Method 600 can be carried out, at least in part, by way of some or all of the manufacturing steps or blocks illustrated and described in reference to FIGS. 5a, 5b. It will be understood that the method 600 can include fewer or more steps or blocks than those expressly disclosed herein. Furthermore, respective steps or blocks of method 600 can be performed in any order and each step or block can be performed one or more times.

Block 602 includes preparing a porous substrate for deposition of a hexagonal boron nitride (h-BN) layer. The porous substrate can be a nanoporous substrate, a microporous substrate, or a macroporous substrate. For instance, the porous can be a nanoporous inorganic substrate (e.g., an anodized alumina oxide substrate). Additionally, the substrate may be a silicon dioxide, zirconia oxide, or members of a metal oxide substrate.

Block 604 includes depositing an h-BN layer on the porous substrate. In an implementation, the boron-nitride layer can be deposited using a low-pressure CVD (LPCVD)

or atomic layer deposition (ALD) system. It will be understood that other deposition methods are possible and contemplated.

FIGS. 7a-7d illustrate various blocks of another method of manufacture 700, according to one or more example embodiments. It will be understood that at least some of the various blocks can be carried out in a different order than of that presented herein. Furthermore, blocks can be added, subtracted, transposed, and/or repeated. FIGS. 7a-7d can serve as example illustrations for at least some of the blocks or steps described in relation to method 800 as illustrated and described in relation to FIG. 8. Additionally, the blocks of FIGS. 7a-7d can be carried out so as to provide boron-nitride nanoparticle membranes 100, 120, 200, 210, and/or 220, as illustrated and described in reference to FIGS. 1a-1b and FIGS. 2a-2c.

Figure 7:
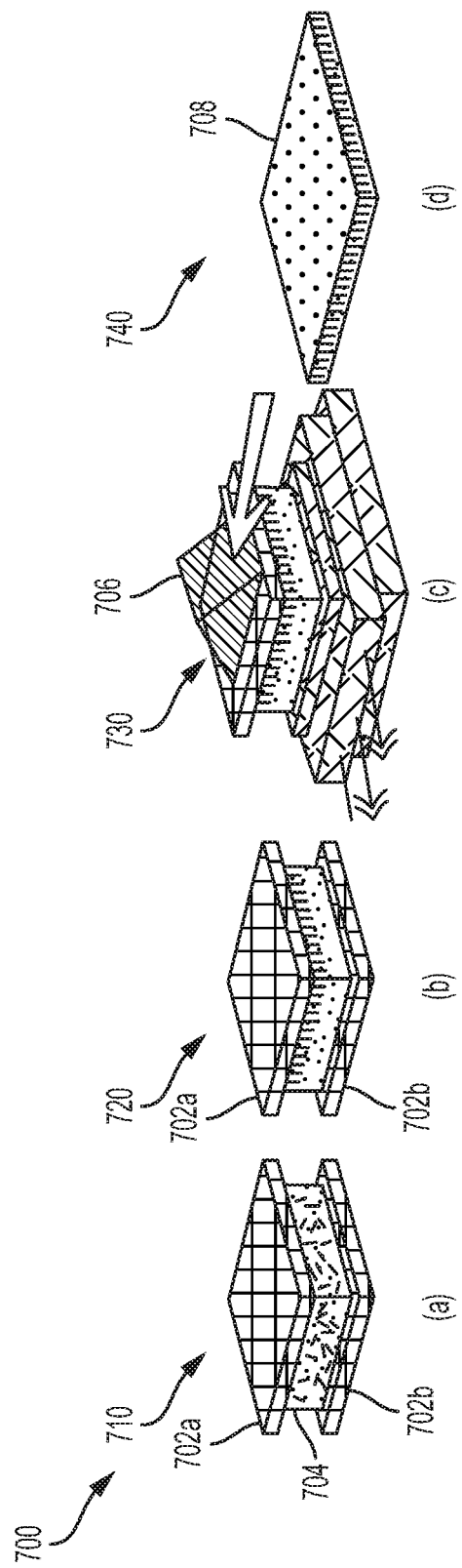
FIG. 7 illustrates a method of manufacturing an electric field-aligned boron-nitride nanoparticle membrane, according to an example embodiment.
Figure 8:
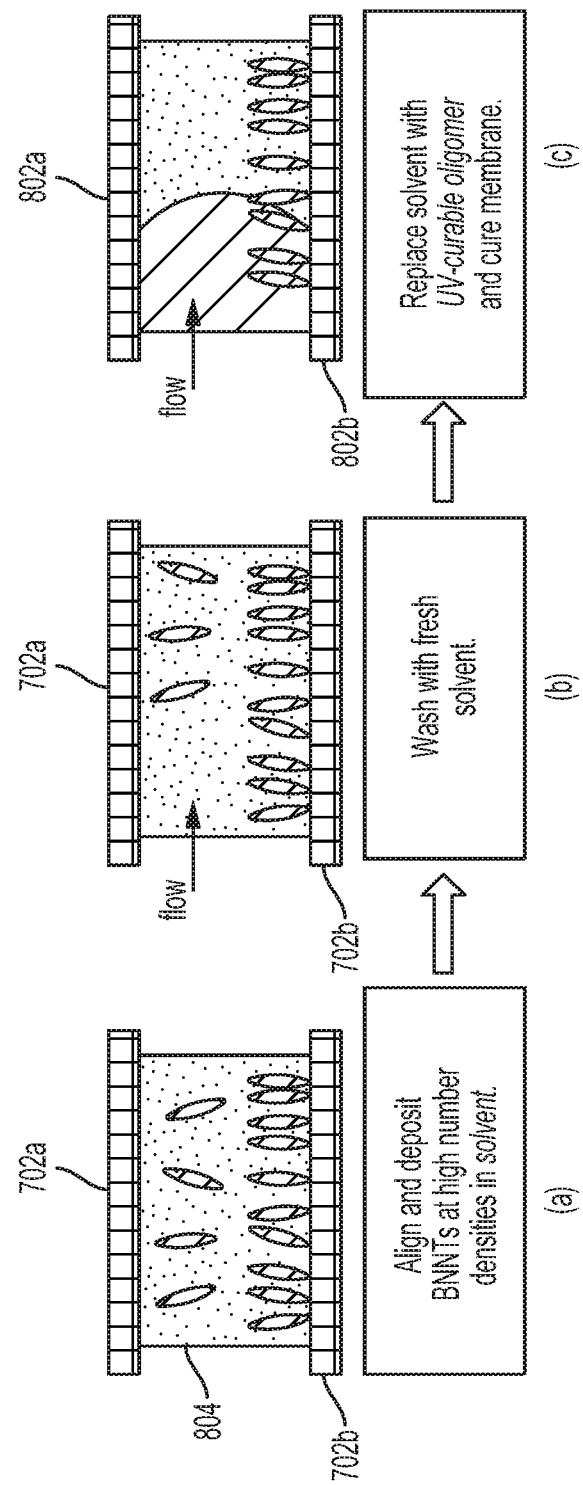
FIG. 8 illustrates a method of increasing a density of boron-nitride nanotubes, according to an example embodiment.

FIG. 7A illustrates a block 710 of a method of manufacture, according to an example embodiment. Block 700 includes dispersing boron-nitride nanotubes in a liquid curable pre-polymer 704 (e.g., an oligomer). For example, the pre-polymer 704 can be an aromatic urethane acrylate in order to take advantage of the 7r-stacking interaction between the nanotubes and the aromatic oligomer. This maximizes the number density of boron-nitride nanotubes that can be stably dispersed in the boron-nitride nanotubes-oligomer solution, which enhances the pore density of the resulting membranes.

The boron-nitride nanotubes can be dispersed in the pre-polymer 704 using one or more dispersing or blending methods such as shear mixing. Additionally, the nanotubes can be dispersed using one or more agitation methods such ultrasonication (i.e., ultrasonic energy) or other high frequency vibration methods. It will be understood that other dispersing methods are possible and contemplated herein.

Further, the liquid pre-polymer 704 can be placed between two conductive electrodes 702a,b. As shown in FIG. 7a, the liquid pre-polymer 704 can be placed between the two conductive electrodes 702a,b such that one electrode is above the liquid pre-polymer 704 and the other electrode is below the liquid pre-polymer 704. In an example, the two conductive electrodes 702a,b can be transparent conductive electrodes. The transparent conductive electrodes can be made up of indium tin oxide (ITO). Other alternative materials include wider-spectrum transparent conductive oxides (TCOs), conductive polymers, metal grids, carbon nanotubes (CNT), graphene, nanowire meshes, and ultra-thin metal films.

Block 720 includes applying an electric field between the two conductive electrodes 702a,b. The electric field can be generated by applying an alternating current (AC) voltage to the conductive electrodes 702a,b. The AC frequency may be in the range of 10 Hz-1 MHz, among other frequencies. As shown in FIG. 7b, the generated electric field can align the boron-nitride nanotubes orthogonal to the two conductive electrodes 702a,b. Using an electric field to align the boron-nitride nanotubes is possible even though boron-nitride nanotubes are wide bandgap materials with low electrical conductivity. However, for a large-aspect-ratio particle in solution under an applied electric field, alignment can result from (1) the electric field interacting with the induced dipole in the particle, and/or (2) charging and motion of the electrical double-layer around the particle due to electric field. The former is classically described by Maxwell-Wagner interfacial polarization, while the latter is known as induced-charge electro-osmosis.

In an implementation, a direct current (DC) voltage can be applied to one of the electrodes. As a result, the generated electric field can have a DC component. The electric field with the DC component can electrophoretically drive the boron-nitride nanotubes out of the bulk solution toward one electrode. For example, as shown in FIG. 7b, the boron-nitride nanotubes can be driven toward the electrode 702a. Driving the nanotubes towards one electrode can increase a pore density of the membrane. This step of electrophoretically driving the boron-nitride nanotubes out of the bulk solution is possible due to the high surface charge of the boron-nitride nanotubes in certain solutions, which results in a large electrophoretic mobility.

Block 720 includes curing a surface layer of the liquid pre-polymer 704 to form a polymer matrix. For instance, the surface layer can be cured using a UV laser or UV lamp of wavelengths in the 100-300 nm range, among other ranges. The membrane curing depth can be precisely controlled by adjusting at least one of the angle, intensity, duration, and wavelength of the UV light that is used to cure the liquid pre-polymer 704. Additionally and/or alternatively, it may be controlled based on a concentration and absorption coefficient of the pre-polymer or photo-initiator. In an implementation, the membrane depth can be controlled such that the depth (width) can match or nearly match (e.g., within a threshold amount such as 1-10%) a length of the boron-nitride nanotubes. Doing so eliminates the need for removing a large thickness of excess cured pre-polymer 704 (i.e., the polymer matrix), thereby reducing the likelihood of introducing defects in the boron-nitride nanoparticle membrane. It will be understood that other curing methods (e.g., heat curing or interfacial polymerization) are possible and contemplated herein.

Block 730 includes uncapping the boron-nitride nanotubes to enable molecular flow through the nanotubes. Uncapping the boron-nitride nanotubes can involve lightly etching the polymer matrix to uncap the boron-nitride nanotubes. Etching the polymer matrix and the aligned boron-nitride nanotubes can be done using plasma etching, for example in a $SF_6$-$O_2$ mixture. Within examples, the membrane can be etched for etched for 1-20 minutes, preferably between 5-10 minutes. Once the membrane is etched, the membrane can be mounted and checked for defects. Other example methods of uncapping the boron-nitride nanotubes can include reactive ion etching, wet etching, or mechanical polishing.

In some embodiments, the method of manufacture can include a process for increasing a pore density of the boron-nitride nanotubes. The process can involve dispersing and aligning the boron-nitride nanotubes in a solvent, such as dimethylacetamide (DMAc), N,N-dimethyl-formamide (DMF), acetone, or N-methyl-2-pyrrolidone (NMP). The process can also involve replacing the solvent with a liquid pre-polymer that can be selectively cured to form a polymer matrix of a desired thickness. By selecting a solvent with advantageous dispersal properties (e.g., dimethylacetamide (DMAc)), the pore density of the boron-nitride nanotubes in the membrane can be controlled and/or increased. For example, the pore densities can be $10^8$-$10^{10}$ BNNTs/cm$^2$. As another example, the pore density may be $10^2$-$10^5$ BNNTs/cm$^2$.

FIGS. 8a-c illustrate a process for increasing a pore density of the boron-nitride nanotubes when performing the method of manufacture of FIGS. 7a-d, according to an exemplary embodiment. As shown in FIG. 8a, rather than dispersing the boron-nitride nanotubes in a pre-polymer as was done in block 710 of FIG. 7a, the boron-nitride nanotubes can be dispersed in a mixture 804. Then, fresh solvent can be used to wash the mixture 804. Once the mixture 804 is washed with fresh solvent, the solvent can be replaced with a liquid pre-polymer. As explained above, the liquid pre-polymer can be selectively cured to form a polymer matrix of a desired thickness.

Figure 9:
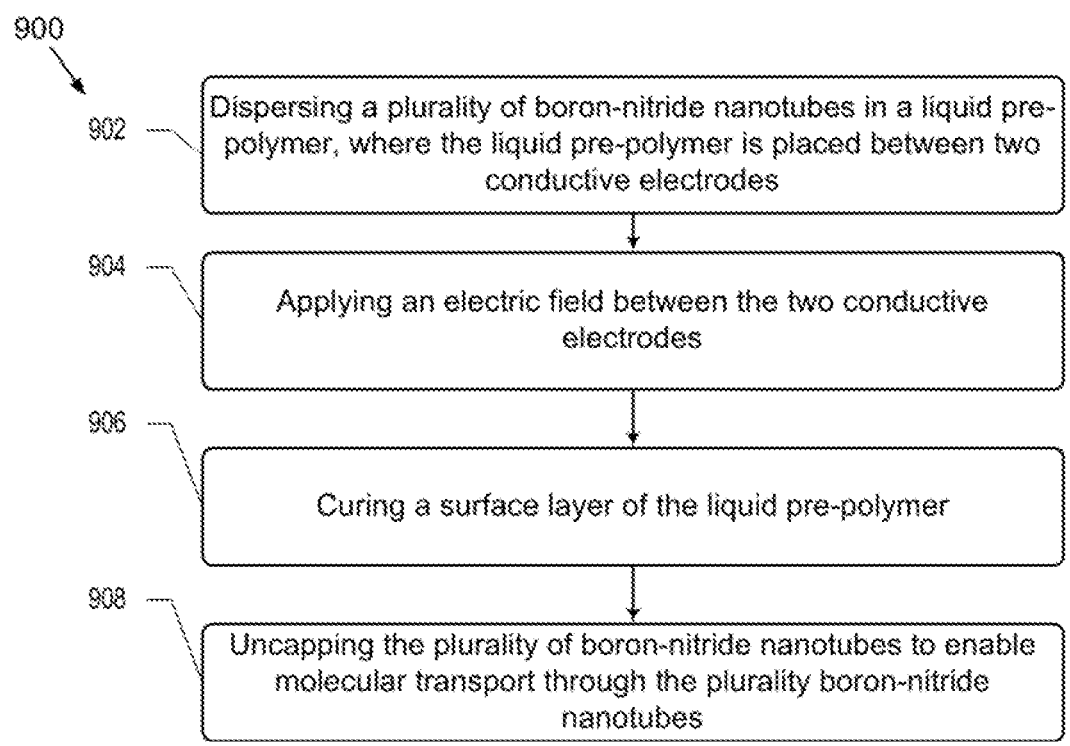
FIG. 9 illustrates a simplified block diagram of yet another method of manufacturing an aligned boron-nitride nanoparticle membrane, according to an example embodiment.

FIG. 9 illustrates a method 900, according to an example embodiment. Method 900 can be carried out, at least in part, by way of some or all of the manufacturing steps or blocks illustrated and described in reference to FIGS. 7a-d. It will be understood that the method 900 can include fewer or more steps or blocks than those expressly disclosed herein. Furthermore, respective steps or blocks of method 900 can be performed in any order and each step or block can be performed one or more times.

Block 902 includes dispersing a plurality of boron-nitride nanotubes in a liquid pre-polymer, where the liquid pre-polymer is placed between two conductive electrodes. Block 904 includes applying an electric field between the two conductive electrodes. Block 906 includes curing a surface layer of the liquid pre-polymer. Block 908 includes uncapping the plurality of boron-nitride nanotubes to enable molecular transport through the plurality boron-nitride nanotubes.

Figure 10:
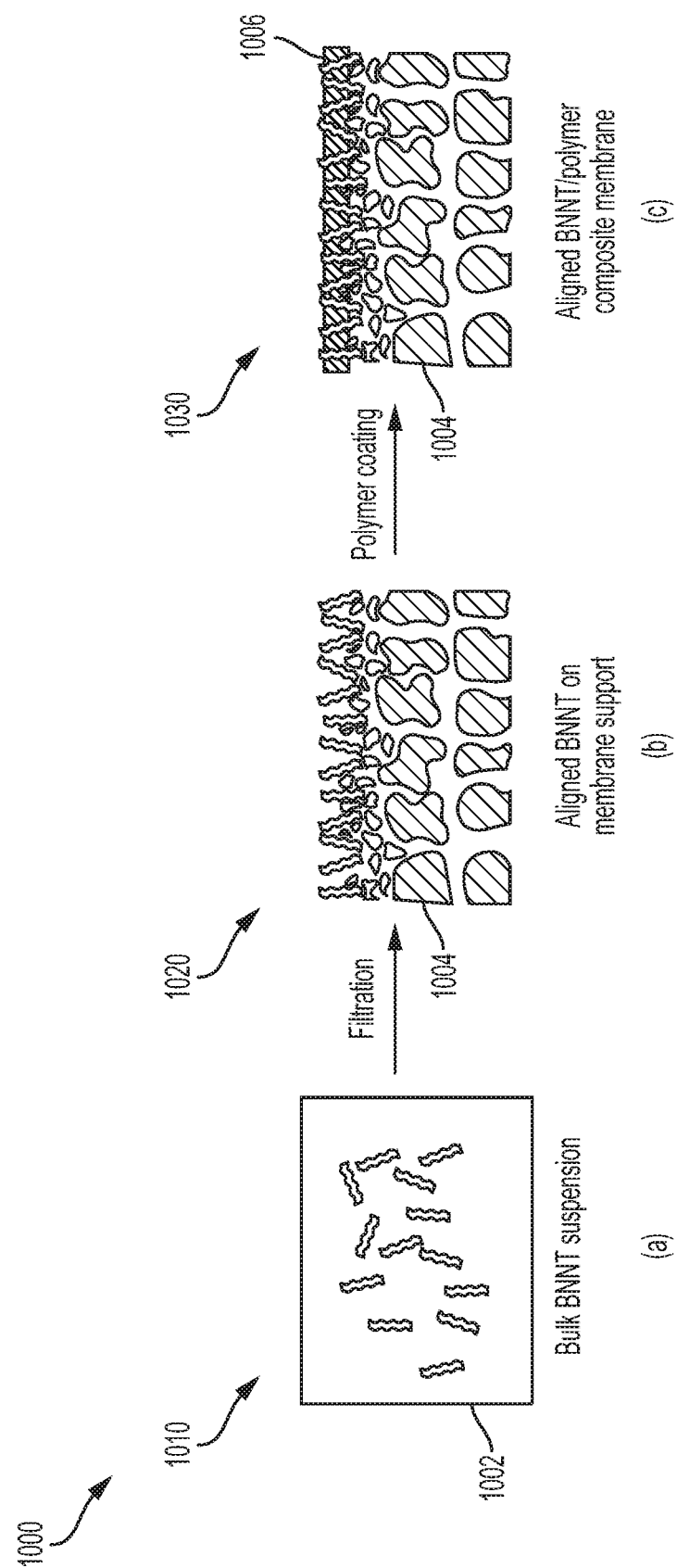
FIG. 10 illustrates a method of manufacturing a shear induced aligned boron-nitride nanoparticle membrane, according to an example embodiment.

FIGS. 10a-c illustrate various blocks of another method of manufacture, according to one or more example embodiments. FIGS. 10a-c can serve as example illustrations for at least some of the blocks or steps described in relation to method 1100 as illustrated and described in relation to FIG. 11. Additionally, the blocks of FIGS. 10a-c can be carried out so as to provide boron-nitride nanoparticle membranes 100, 120, 200, 210, and/or 220, as illustrated and described in reference to FIGS. 1a-1b and FIGS. 2a-2c.

FIG. 10a illustrates a block 1010 of a method of manufacture, according to an example embodiment. Block 1000 includes dispersing a plurality of boron-nitride nanotubes in a solvent 1002, perhaps a liquid pre-polymer, to form a well-dispersed boron-nitride nanotube solution.

Block 1020 includes causing the boron-nitride nanotube solution to flow through pores of a porous membrane support 1004. Causing the solution to flow through the support pores can induce alignment (e.g., complete, partial alignment, vertical alignment) of the nanotubes in the solution in a direction orthogonal to a top surface of the membrane support. Within examples, the porous membrane support 1004 can be a macroporous, microporous, or a nanoporous membrane support.

Block 1030 includes fixing the aligned boron-nitride nanotubes on the pores of the membrane support 1004. In an implementation, the aligned boron-nitride nanotubes remaining on the pores can be coated with a polymer layer, such as polyimide polysulfone, cellulose acetate, polycarbonate, polymethacrylate, thermoplastic polymers, and glassy polymers. In another implementation, the aligned nanotubes can be fixed in a polymer matrix with an in-situ polymerization process of the solvent 1002. For instance, the solvent can be cured by exposing the solvent 1002 to UV light. It will be understood that other curing methods are possible and contemplated herein.

Figure 11:
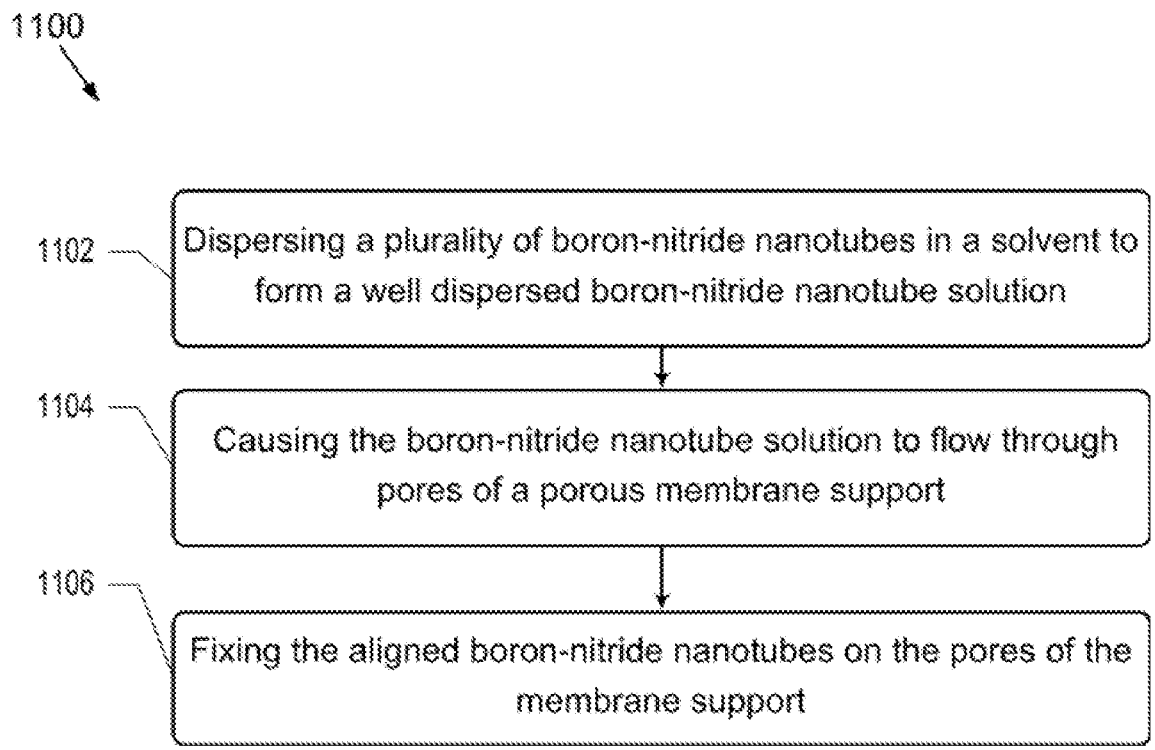
FIG. 11 illustrates a simplified block diagram of another method of manufacturing an aligned boron-nitride nanoparticle membrane, according to an example embodiment.

FIG. 11 illustrates a method 1100, according to an example embodiment. Method 1100 can be carried out, at least in part, by way of some or all of the manufacturing steps or blocks illustrated and described in reference to FIGS. 10a-c. It will be understood that the method 1100 can include fewer or more steps or blocks than those expressly disclosed herein. Furthermore, respective steps or blocks of method 1100 can be performed in any order and each step or block can be performed one or more times.

Block 1102 includes dispersing a plurality of boron-nitride nanotubes in a solvent to form a well-dispersed boron-nitride nanotube solution. Block 1104 includes causing the boron-nitride nanotube solution to flow through pores of a porous membrane support. Block 1106 includes fixing the aligned boron-nitride nanotubes on the pores of the membrane support.

Figure 12:
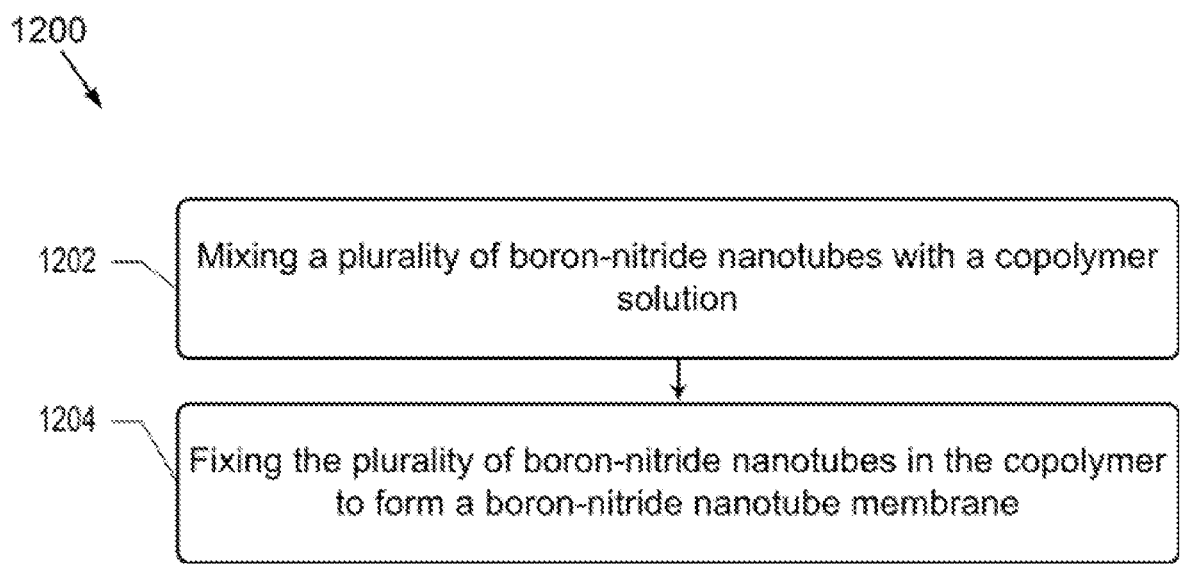
FIG. 12 illustrates a simplified block diagram of another method of manufacturing an aligned boron-nitride nanoparticle membrane, according to an example embodiment.

FIG. 12 illustrates a method 1200 of manufacture, according to an example embodiment. It will be understood that the method 1200 can include fewer or more steps or blocks than those expressly disclosed herein. Furthermore, respective steps or blocks of method 1200 can be performed in any order and each step or block can be performed one or more times.

Block 1202 includes mixing a plurality of boron-nitride nanotubes with a copolymer solution. Generally, a copolymer solution, due to phase separation, can form periodic spatial patterns, such as periodic lamellar, spherical, and cylindrical structures. In some examples, depending on the copolymer and/or solvent that are selected, the periodic spatial patterns can be vertically oriented. Within examples, mixing boron-nitride nanotubes with such a copolymer solution (e.g., PS-b-P4VP) that forms vertically oriented periodic spatial patterns can cause the boron-nitride nanotubes to also be vertically aligned. Other possible copolymers include acrylonitrile butadiene styrene (ABS), styrene/butadiene co-polymer (SBR), nitrile rubber, styrene-acrylonitrile, styrene-isoprene-styrene (SIS) and ethylene-vinyl acetate.

Block 1204 includes fixing the plurality of boron-nitride nanotubes in the copolymer solution to form a membrane. In an example, the solution can be cast into a membrane form in order to form a boron-nitride nanoparticle membrane. It will be understood that other methods of fixing the plurality of boron-nitride nanotubes in the copolymer are possible and contemplated herein.

b. Randomly Oriented One-Dimensional Boron-Nitride Nanoparticle Membranes

Figure 13:
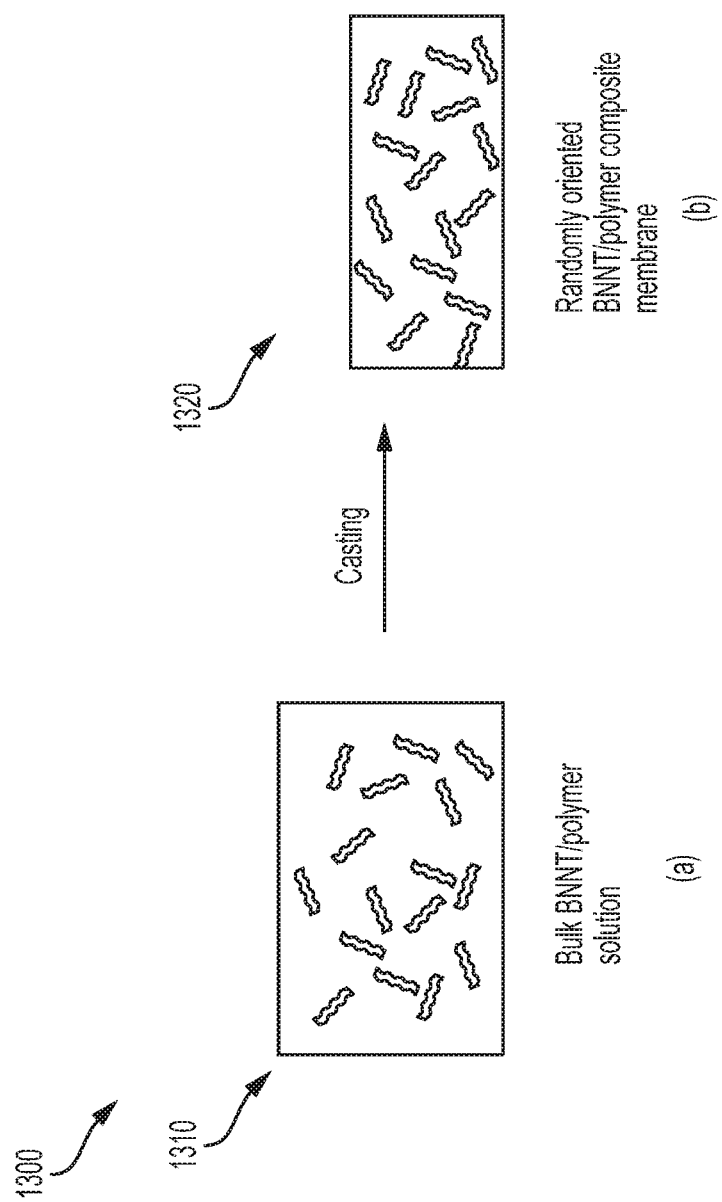
FIG. 13 illustrates a method of manufacturing a boron-nitride nanoparticle membrane using casting, according to an example embodiment.

FIGS. 13a-b illustrate various blocks of a method of manufacture of a randomly oriented one-dimensional boron-nitride nanoparticle (e.g., boron nitride nanotube) membrane, according to one or more example embodiments. The blocks of FIGS. 13a-b can be carried out so as to provide boron-nitride nanoparticle membrane 300 as illustrated and described in reference to FIG. 3.

FIG. 13a illustrates a block 1300 of a method of manufacture, according to an example embodiment. Block 1300 includes dispersing a plurality of boron-nitride nanotubes in a polymer solution or a polymer melt to form a well dispersed boron-nitride nanotube solution or a boron-nitride nanotube melt.

Block 1310 includes casting the resulting boron-nitride nanotube solution or resulting boron-nitride nanotube melt into a membrane form. In a casting process, the polymer solution or melt can be coated onto a carrier substrate. Then, the water or solvent is removed, perhaps by evaporation, resulting in a membrane that includes boron-nitride nanotubes randomly oriented in a polymeric matrix.

Figure 14:
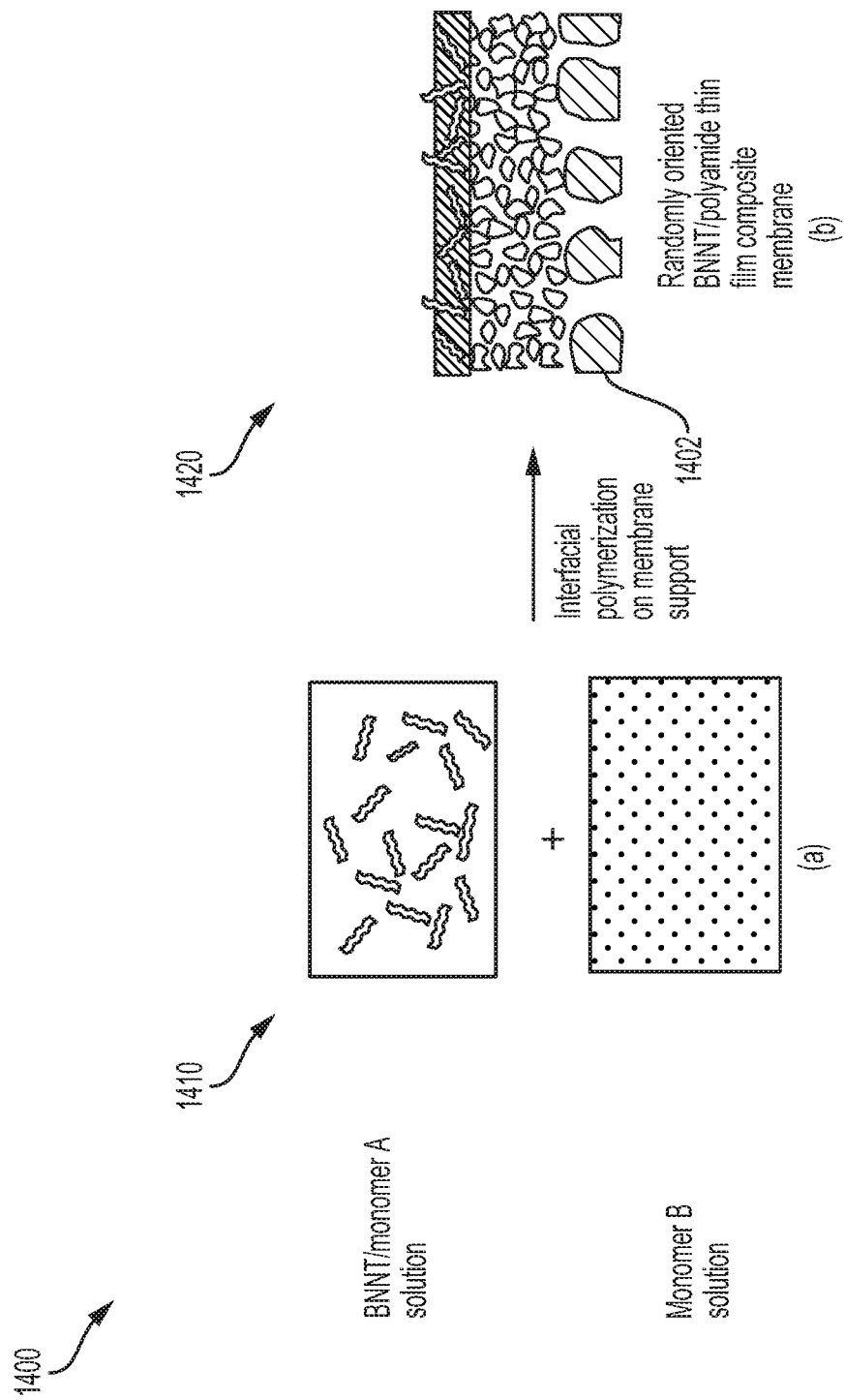
FIG. 14 illustrates a method of manufacturing a boron-nitride nanoparticle membrane using interfacial polymerization, according to an example embodiment.

FIGS. 14a-b illustrate various blocks of another method of manufacture of a randomly oriented one-dimensional boron-nitride nanoparticle (e.g. boron nitride nanotube) membrane, according to one or more example embodiments. The blocks of FIGS. 13a-b can be carried out so as to provide boron-nitride nanoparticle membrane 300 as illustrated and described in reference to FIG. 3.

FIG. 14a illustrates a block 1400 of a method of manufacturing a boron-nitride nanoparticle membrane using interfacial polymerization, according to an example embodiment. Interfacial polymerization is a process that allows for synthesis of a polymer at an interface between two phases. For example, polymerization can occur at an interface between an aqueous solution and hydrophobic organic solution. Block 1400 includes dispersing boron-nitride nanotubes in either an organic or an aqueous solution.

Block 1410 includes causing the two solutions (i.e., monomer A solution and monomer B solution) to come in contact with one another in the proximity of a membrane support 1402. Upon contact of the two solutions, a polymeric film (e.g., polyamide) can be formed on the membrane support 1402. When the polymeric film forms it can embed randomly oriented boron-nitride nanotubes that were dispersed in one of the solutions, thereby forming the boron-nitride nanoparticle membrane.

Figure 15:
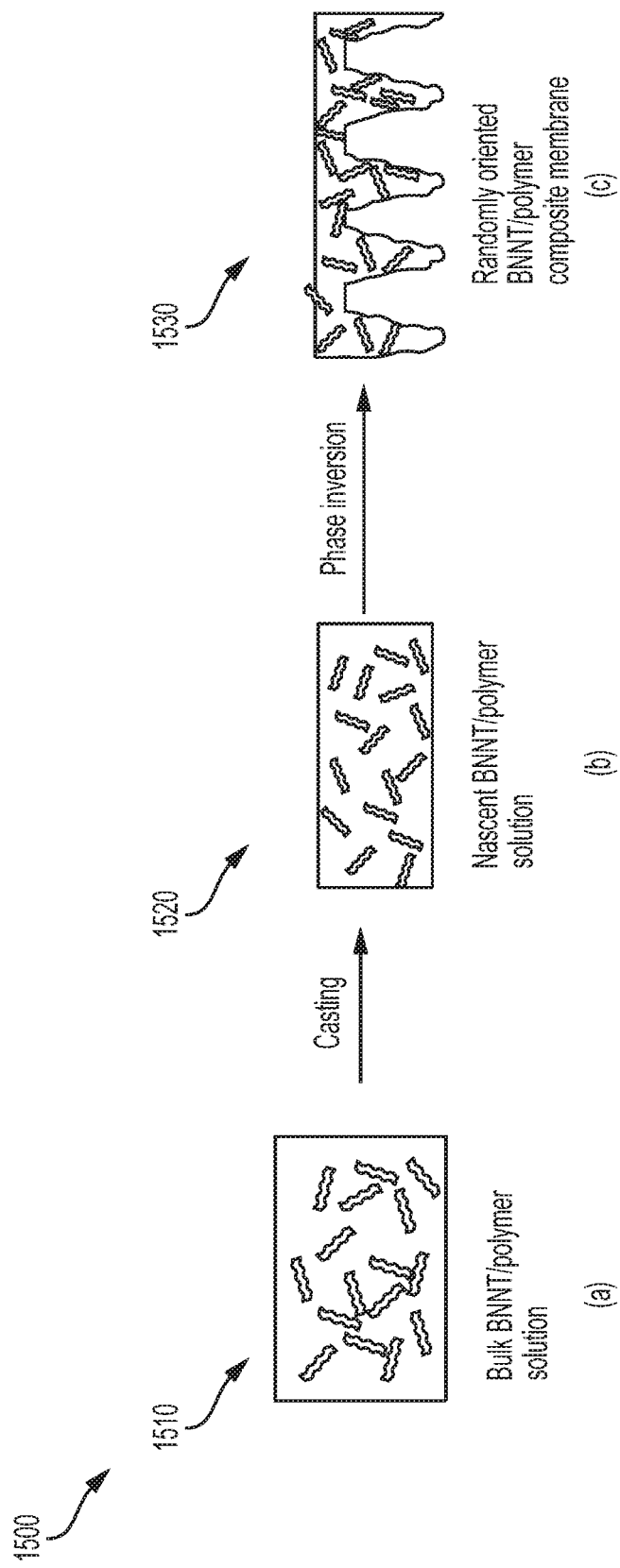
FIG. 15 illustrates a method of manufacturing a boron-nitride nanoparticle membrane using a phase inversion, according to an example embodiment.

FIGS. 15*a*-*c* illustrate various blocks of another method of manufacture of a randomly oriented boron-nitride nanoparticle membrane, according to one or more example embodiments. The blocks of FIGS. 15*a*-*b* can be carried out so as to provide boron-nitride nanoparticle membrane 300 as illustrated and described in reference to FIG. 3.

FIG. 15*a* illustrates a block 1500 of a method of manufacturing a one-dimensional boron-nitride nanoparticle membrane using immersion precipitation, according to an example embodiment. Block 1500 includes dispersing boron-nitride nanotubes into a polymer casting solution. Block 1510 includes casting the polymer solution on a backing layer (e.g., non-woven fabric, woven fabric, mesh fabric). Block 1520 includes immersing the backing layer into a coagulant bath that includes a non-solvent. Due to the solvent and non-solvent exchange, precipitation of the polymer (with the boron-nitride nanotubes) occurs, thereby forming the boron-nitride nanoparticle membrane.

c. Additional Methods

Within examples, in one or more of the manufacturing methods described above, a molecular selectivity of the fabricated membrane can be increased by functionalizing the ends of the one-dimensional boron-nitride nanoparticle with particular functional groups or molecules. Examples of functional groups include acidic groups, basic groups, permanently charged groups, amine, alkane, alkene, alkyne, alkoxy, ether, ester, carboxylic acid, and phosphoric acid functional groups.

Furthermore, as explained above, in some instances a boron-nitride nanoparticle membrane can have a desired pore density. Accordingly, each of the methods described above can include a step of determining a desired density of nanotubes, perhaps based on an application in which the membrane can be used. For example, a method can include a step of determining a desired density of boron-nitride nanotubes in a boron-nitride nanoparticle membrane. Based on the desired density of nanotubes, an amount of boron-nitride nanotubes to use a particular method may be determined. Additionally, the method can include a step of fabricating the boron-nitride nanoparticle membrane with the desired density of boron-nitride nanotubes.

Furthermore, disclosed herein are methods and systems of characterizing properties of the boron-nitride nanoparticle membranes manufactured using one or more fabrication methods disclosed herein.

Figure 16:
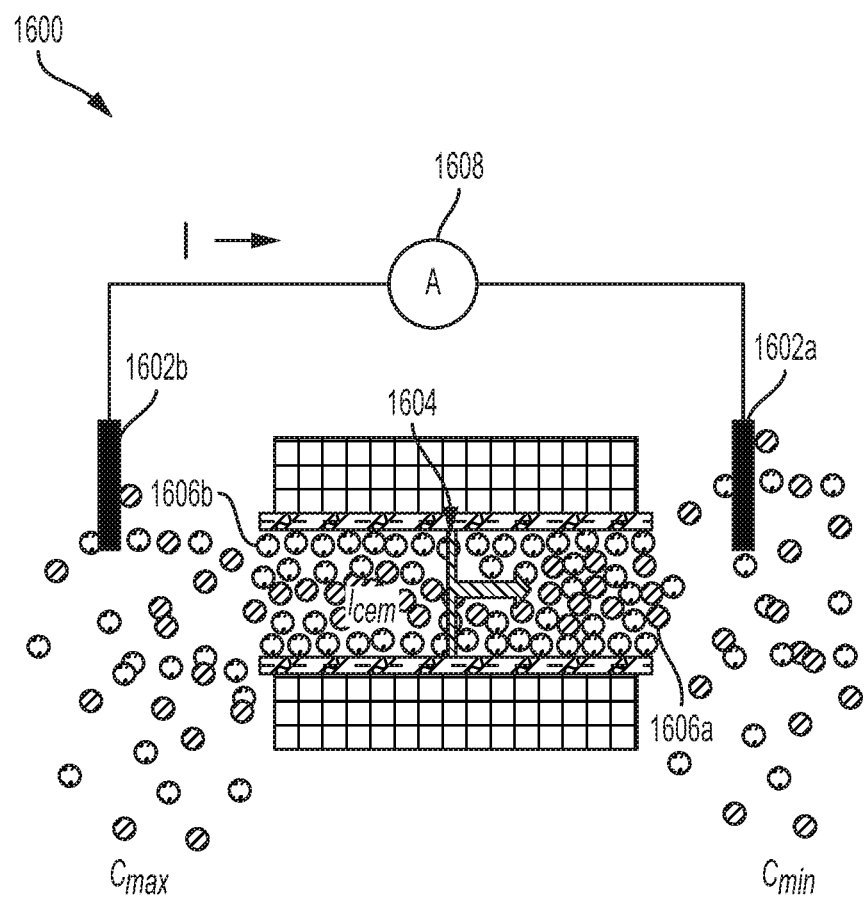
FIG. 16 illustrates a testing system, according to an example embodiment.

FIG. 16 illustrates a testing system 1600, according to an example embodiment. The system includes compartments 1606*a* and 1606*b*, each of which may be filled with a respective aqueous ionic solution (e.g., KCl, LiCl, NaCl, CsCl, MgSO$_4$). Further, the system includes a boron-nitride nanoparticle membrane 1604 that separates the two solutions. Yet further, the system may be placed in a Faraday cage to minimize environmental noise.

Due to the difference of ion concentration between the solutions in the compartments, there can be a concentration gradient from the high concentration solution to the low concentration solution, which results in an osmotic current (e.g., ionic current) across the reservoirs. The ionic current across the reservoirs can be monitored, perhaps using electrodes (e.g., Ag/AgCl electrodes) 1602*a*,1602*b* and ammeter 1608.

In this setup, the solution pH can be adjusted, perhaps using HCl and KOH. Further, the surface-charge density of the boron-nitride nanoparticles can be measured using the streaming potential method. Further, the measured electric conductance of the membrane 1604 for various conditions (e.g., nanotube diameter and length, salt concentration, and pH) can provide key information on the surface properties of the boron-nitride nanoparticles.

IV. Applications of Boron-Nitride Nanotube Membranes

Several characteristics of boron-nitride nanotubes make them attractive for use in different applications. Most notably, the high selectivity level of boron-nitride nanotubes enable the nanotubes to effectively be used in a variety of applications. In fact, as a result of the high level of selectivity, using boron-nitride nanoparticle membranes offers significant advantages over current technologies.

Notably, boron-nitride nanoparticle membranes can significantly improve energy harvesting systems that rely on salinity gradients for power generation. By way of background, energy harvesting systems that rely on a salinity gradient can harvest energy from the Gibbs free energy of mixing of two solutions with a salinity gradient between them. Globally, there is a potential of at least 2.6 terawatts (TW) (the equivalent of approximately 2,000 nuclear reactors) that could be generated at coastal estuaries from the Gibbs free energy of mixing of fresh and salt water.

Disclosed herein are energy-harvesting systems that utilize boron-nitride nanoparticle membranes to generate energy. In particular, the systems disclosed herein provide significant performance improvements over current power harvesting technologies that rely on salinity gradients. As described above, the boron-nitride nanoparticle membranes disclosed herein can be fabricated with a boron-nitride pore density of approximately $10^{10}$ nanotubes/cm$^2$. Such a density can result in a power density of approximately 200 W/m$^2$, which is orders of magnitude higher than that of the conventional membrane-based osmotic power generation (1-3 W/m$^2$), microfluidic systems (7 W/m$^2$), and photovoltaic systems (100 W/m$^2$). Such a significant power density can enable energy harvesting anywhere ion-concentration gradients are present and can be used in a variety of applications, such as large-scale power generation at coastal estuaries, micro batteries, and micro power generators.

Figure 17:
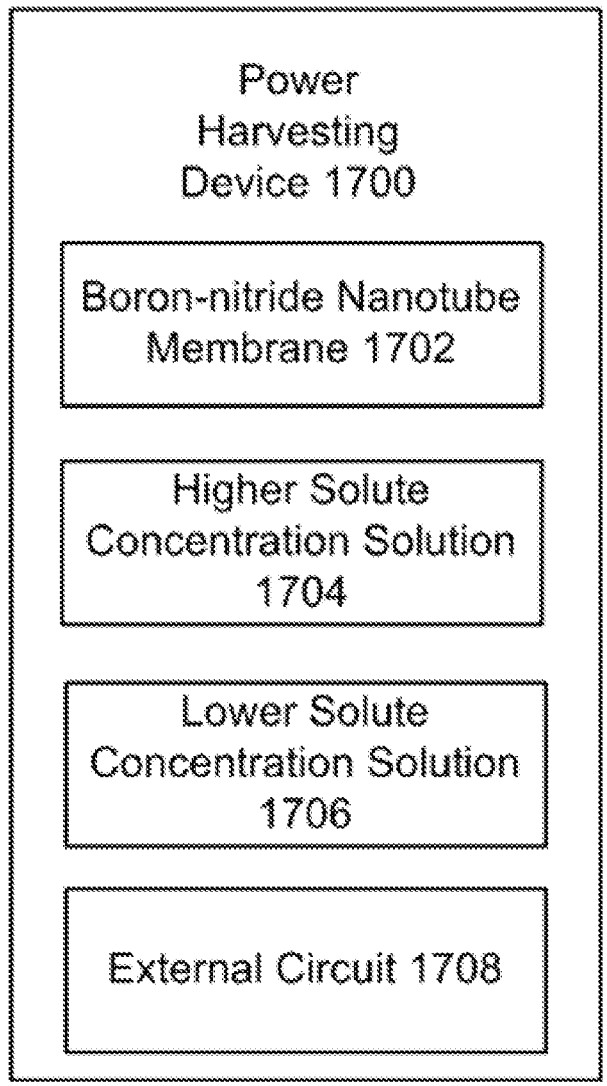
FIG. 17 illustrates a simplified block diagram of a power harvesting device, according to an example embodiment.

FIG. 17 illustrates a simplified block diagram of a power-harvesting device 1700, according to an example embodiment. As shown in FIG. 17, the power-harvesting device 1700 can include a boron-nitride nanoparticle membrane 1702, a high solute concentration solution 1704, and a low solute concentration solution 1706. For example, the high solute concentration solution 1704 can be salt water and the low solute concentration solution 1706 can be fresh water. Within examples, the boron-nitride nanoparticle membrane 1702 can separate the two solutions, which can be stored separately. Additionally, the power-harvesting device 1700 can include an external circuit 1708 that can provide an electric path between the solution (e.g., acid rain/fresh water, juice/fresh water, urine/fresh water, industrial wastewater/fresh water, blood/water).

Figure 18:
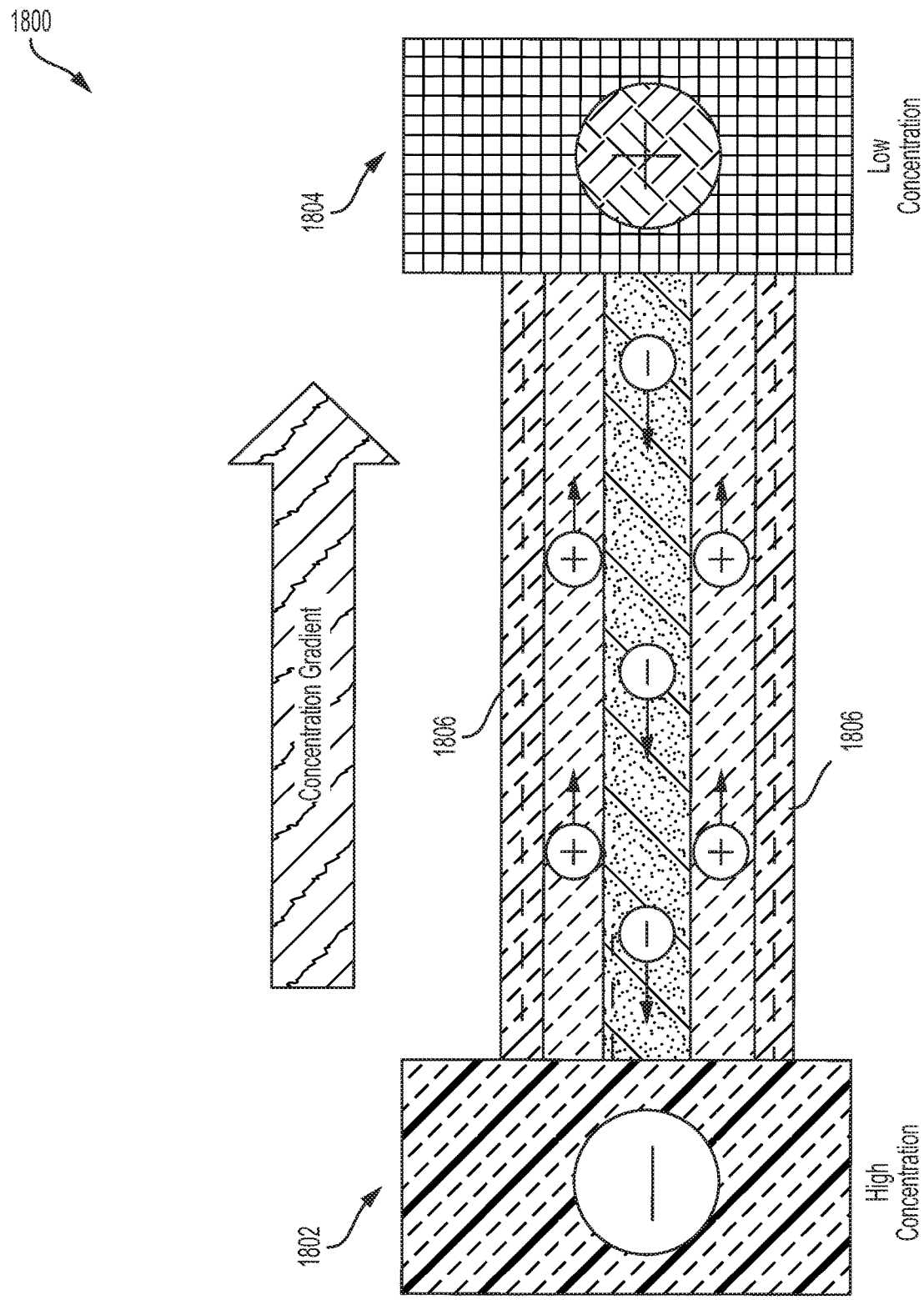
FIG. 18 illustrates a simplified representation of a power harvesting device, according to an example embodiment.

FIG. 18 illustrates a representation of the power-harvesting device 1800, according to an example embodiment. As show in FIG. 18, a high ion concentration solution can be stored on one side of the device 1800 in a compartment 1802 while a low ion concentration solution can be stored on the other side of the device 1800 in a compartment 1804. A one-dimensional boron-nitride nanoparticle membrane 1806 can separate the two solutions. Further, the two sides of the chamber can be coupled by an external circuit (not illustrated). Note that the dimensions of the device 1800 are exaggerated for the purposes of this example. As explained above, the inner diameters of boron-nitride nanotube can range from 0.5 nm to 100 nm.

As a result of the difference of ion concentration between the two solutions, there can be a concentration gradient from the high concentration solution to the low concentration solution. Because the boron-nitrides have a negative surface charge, positively charged ions can flow in the direction of the concentration gradient from the solution with high ion concentration to the solution with low ion concentration (also called osmotic transport of ions). To maintain balance in the high concentration solution, a negatively charged ion can flow through the external circuit for each positively charged ion that travels through the one-dimensional boron-nitride nanoparticle membrane, thereby generating an electric current in the external circuit. The operation of the chamber 1800 is similar to the operation of a liquid battery.

Figure 19:
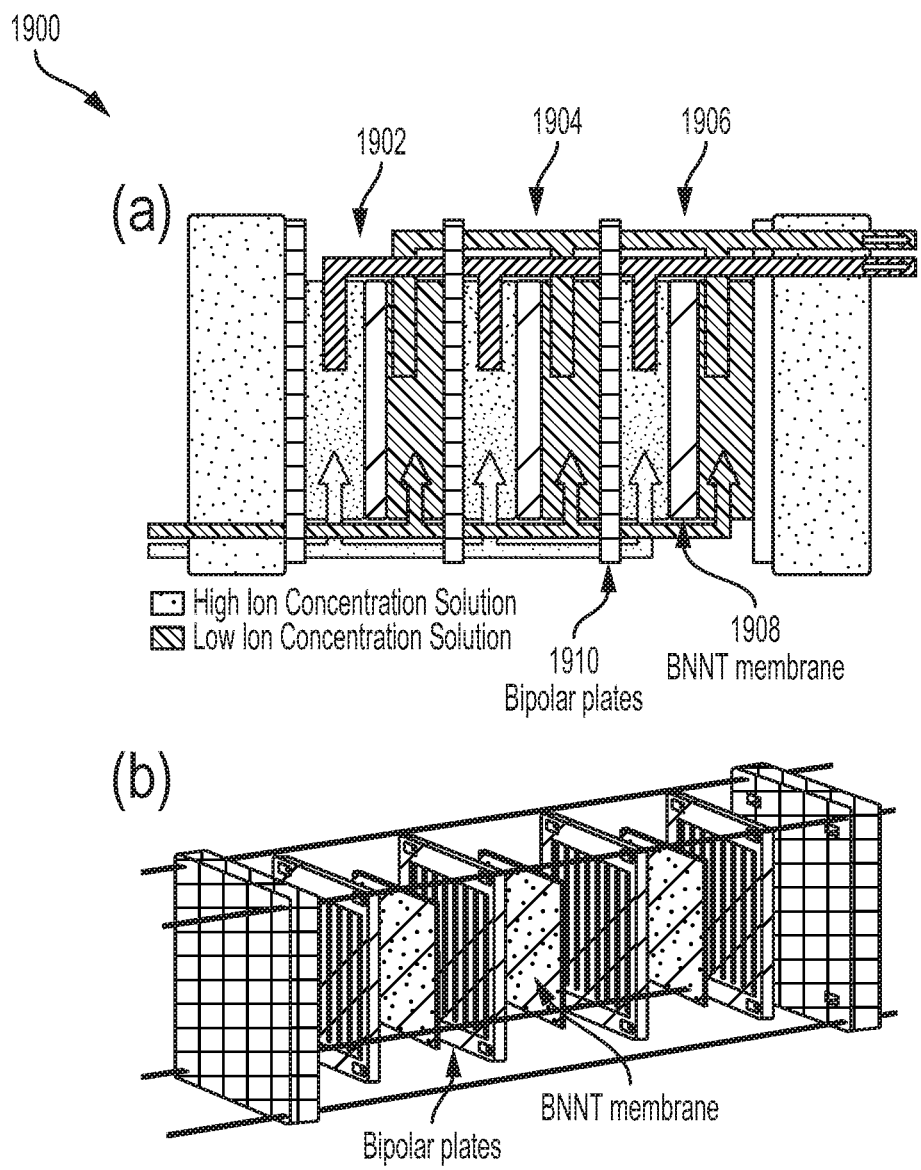
FIG. 19 illustrates a simplified model of a power harvesting device with multiple membranes, according to an example embodiment.

FIG. 19*a,b* illustrate a power-harvesting device 1900, according to an example embodiment. As shown in the figures, the device can include cells 1902, 1904, 1906 that are separated by bipolar plates (e.g., bipolar plate 1910). The bipolar plates, which can be made from non-porous graphite, coated metallic sheets, polymer composites, can distribute fuel gas and air in the cells, conduct electrical current between the cells, remove heat from the active area, and prevent leakage of gases. In each cell, a one-dimensional boron-nitride nanoparticle membrane (e.g., nanotube membrane 1908) separates two solutions: a high ion concentration solution and a low ion concentration solution. The example device 1900 includes three cells, however, the device 1900 can include more than or fewer than three cells.

Each of the cells of the device 1900 can operate as described in FIG. 18. Accordingly, each chamber can contribute to the osmotic current that is generated by the device 1900. Within examples, the amount of osmotic current, and thus the power density, can depend on a selectivity of the membranes, which in turn can depend on several factors including a density of the boron-nitride nanotubes, structural parameters of the boron-nitride nanotubes, molarity ratio of the solutions, salt concentration, and electrolyte type, and a pH of each of the solutions. For example, osmotic current and the power density through the membrane increase with an increase in the molarity ratio ($C_H/C_L$) as well as solution pH.

Within examples, the power-harvesting device 1900 can be used anywhere ion-concentration gradients are present and could be used in a variety of applications, such as large-scale power generation at coastal estuaries, micro batteries, and micro power generators. For example, the device 1900 can be used as a power source for in vivo electronics such as pacemakers, neurostimulators, pressure, temperature, and pH sensors. Additionally, the device 1900 can be used to power lab-on-a-chip devices for medical diagnostic applications.

In an example, a flow-control device or element may be coupled to the device 1900 to control the flow of the solution across the membrane (e.g., increase or decrease the flux across the membrane) in order to control the amount of power that is generated by the device 1900. Accordingly, in examples where the device 1900 is used in an electric grid, the device 1900 can generate more or less electricity as is demanded from a grid application by controlling the flux of solution across the membrane. For example, the power provider can send a signal to the device 1900 to increase generation or decrease based on peak shifting needs. Thus, the device 1900 can change the velocity of the solution (e.g., by changing the cross-sectional area of the membrane or the flow-control device).

Figure 20:
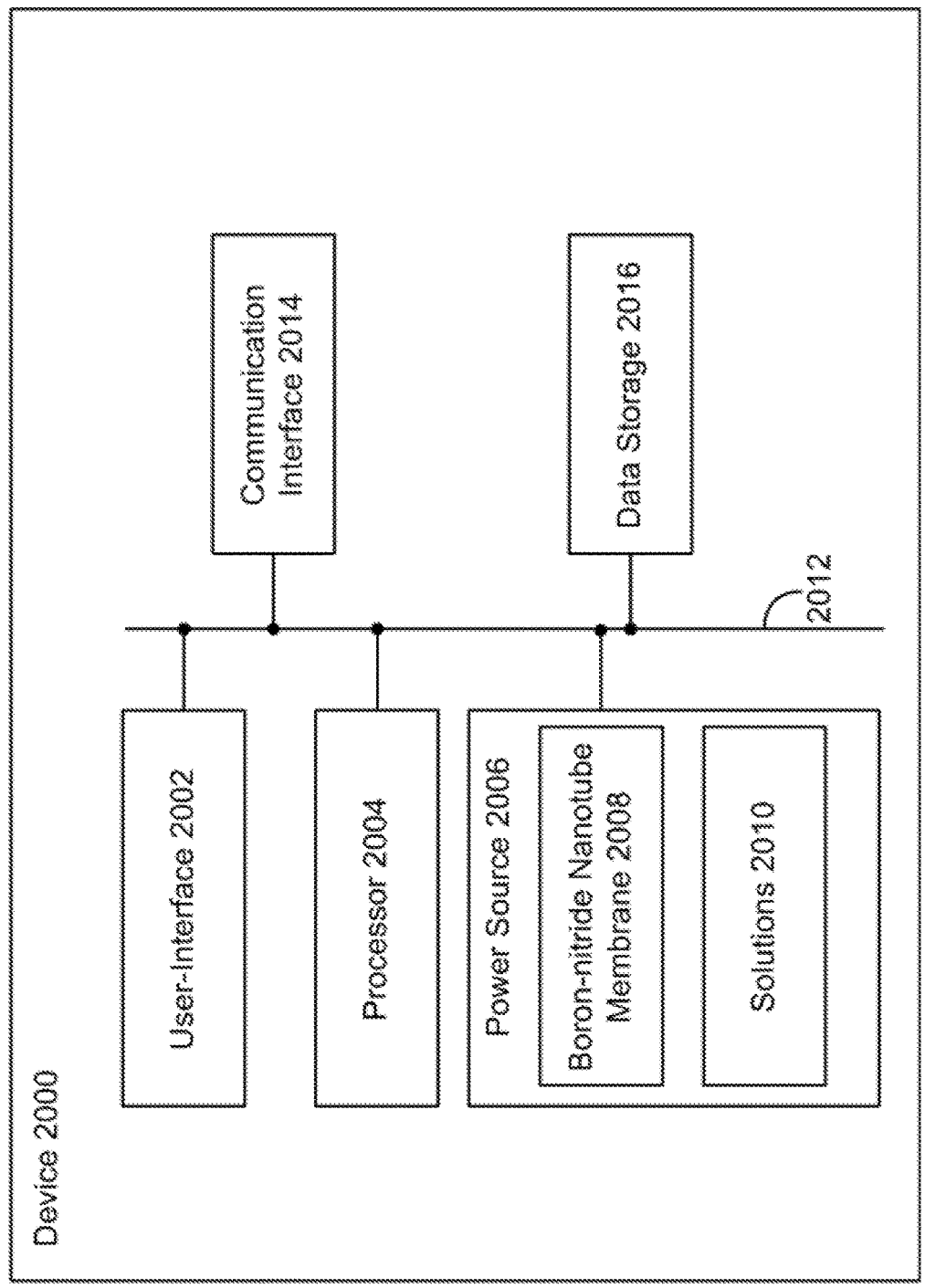
FIG. 20 illustrates a simplified block diagram of a device, according to an example embodiment.

FIG. 20 is a simplified block diagram of a device 2000. The device 2000 can take a variety of forms, including for example a mobile electronic device, a computing device, a medical device (e.g., pacemaker, neurostimulator, etc.), or a sensor (e.g., pressure, temperature, pH sensor, etc.).

The device 2000 can include various components, including for example, a user-interface 2002, a processor 2004, a power source 2006, a communication interface 2014, and a data storage 2016, all of which can be electronically connected to each other via a system bus or other connection mechanism 2012. Note that the device 2000 need not include all of these components and it can include additional components.

The user-interface 2002 can function to allow the device 2000 to interact with a user, such as to receive input from a user and to provide output to the user. Thus, the user-interface 2002 can include input components such as a computer mouse, a keyboard, or a touch-sensitive panel. The user-interface 2002 can also include output components such as a display screen (which, for example, can be combined with a touch-sensitive panel) or a speaker.

The communication interface 2014 can function to allow the device 2000 to communicate with other devices. The communication interface 2014 can be configured to transmit and/or receive various types of data, including for example sensor data. In one example, the communication interface 2014 can take the form of a wired interface, such as an Ethernet port or USB port. As another example, the communication interface 2014 can take the form of a wireless interface, such as a WiFi interface. In either case, the communication interface 2014 can include communication input and/or communication output interfaces.

The processor 2004 can include one or more general-purpose processors (e.g., microprocessors) and/or one or more special purpose processors (e.g., digital signal processors (DSPs), graphics processing unit (GPU), etc.).

The data storage 2016 can include one or more volatile and/or non-volatile storage components, such as magnetic, optical, flash, or organic storage, and can be integrated in whole or in part with the processor 2004. The data storage 2016 can include removable and/or non-removable components. In some examples, the data storage 2016 can include multiple storage drives that store data in a redundant and/or stripped configuration.

Generally, the processor 2004 can be configured to execute program instructions (e.g., compiled or non-compiled program logic and/or machine code) stored in the data storage 2016 to perform one or more of the functions. As such, the data storage 2016 can take the form of a non-transitory computer-readable storage medium, having stored thereon program instructions that, upon execution by the processor 2004, cause the device 2000 to perform one or more of the functions.

Furthermore, the device 2000 can include a power source 2006. For example, the power source can include a power harvesting device that relies on a salient-gradient to generate energy that can power the device 2000. Within examples, the power source 2006 can include one or more boron-nitride nanoparticle membranes 2008 and solutions 2010 that have a salient-gradient between them.

Within examples, boron-nitride nanoparticle membranes can be used in passive applications such as filtration and separation that require selective charged molecule removal. In an example, the membranes may be used for ion, dye, and charged-molecule separation in a desalination, nanofiltration, and water purification applications. For example, one-dimensional boron nitride membrane can be used for the removal of the dyes from the industrial waste waters. Boron nitride is known to have an excellent oxidation and corrosion resistance which is an important quality for the water treatment membranes. The high chemical stability of boron nitrides suggests that chemical cleaning for the recycling of the membrane surface could be easily achieved. In addition, boron nitride is known to maintain a very low friction coefficient up to 900° C., which could significantly improve the flux through the membrane. The boron-nitride membrane shows a high ion rejection, >98%, for negatively charged ions (e.g., potassium ferricyanide, Acid Blue 92, Congo Red, Acid Orange 7, Direct Blue 71).

We claim:

1. A membrane comprising:
   a matrix having a first surface and an opposed second surface, wherein the matrix is at least one of a polymeric matrix or an inorganic matrix; and
   a plurality of substantially vertically aligned boron-nitride nanoparticles disposed in the matrix, wherein each of the plurality of substantially vertically aligned boron-nitride nanotubes extends beyond at least one of the first surface of the matrix and the second surface of the matrix, wherein each of the plurality of boron-nitride nanotubes includes a first end exposed and opened by etching at the first surface of the matrix and a second end exposed and opened by etching at the second surface of the matrix, and an inner hollow diameter configured for selective molecular transport from the first surface of the matrix to the second surface of the matrix.

2. The membrane of claim 1, wherein the plurality of boron-nitride nanotubes are uniformly dispersed in the matrix.

3. The membrane of claim 1, wherein the plurality of boron-nitride nanoparticles has a surface charge density of at least 0.01 $C/m^2$.

4. The membrane of claim 1, wherein a material of the matrix is selectively permeable.

5. The membrane of claim 1, wherein the plurality of boron-nitride nanoparticles have diameters from about 0.5 nanometers to about 100 nanometers.

6. The membrane of claim 1, wherein the plurality of boron-nitride nanoparticles comprise a thin hexagonal boron nitride layer deposited within pores of a nanoporous substrate.

7. An energy harvesting device comprising:
   the membrane of claim 1; and
   a first solution and a second solution separated by the membrane, wherein the first solution has a first ion concentration and the second solution has a second ion concentration.

8. The membrane of claim 1, wherein the membrane further comprises a membrane support supporting the matrix thereof.

9. The membrane of claim 1, wherein the matrix is a polymer matrix, and wherein the polymer matrix is susceptible to plasma etching.

10. The membrane of claim 1, wherein the boron-nitride nanotubes are present in a density of $10^5$ to $10^{10}$ boron-nitride nanotubes per square centimeter.

11. The membrane of claim 1, wherein the matrix is a polymeric matrix.

12. The membrane of claim 11, wherein the polymeric matrix comprises polyimide, polysulfone, a cellulose acetate, a polycarbonate, a polymethacrylatepolystyrene, polymethyl methacrylate, polyvinyl alcohol, polyactide-polycaprolactone copolymers, or Nafion.

13. The membrane of claim 1, wherein the matrix is an inorganic matrix.

14. The membrane of claim 13, wherein the inorganic matrix comprises ceramic, oxides, or silicon nitride.

* * * * *